United States Patent
Kremmling et al.

[11] Patent Number: 6,116,391
[45] Date of Patent: Sep. 12, 2000

[54] METHOD OF AND APPARATUS FOR ACTUATING THE TORQUE TRANSMITTING SYSTEM AND THE TRANSMISSION IN THE POWER TRAIN OF A MOTOR VEHICLE

[75] Inventors: Burkhard Kremmling, Renchen; Nguyen van Doan, Frankfurt; Gerhard Overdiek, Friedrichsdorf; Ivo Agner, Bad Homburg; Dirk Heintzen, Hagen; Dethlef Axmacher, Iserlohn; Matthias Gramann, Neunkirchen; Gerhard Hettlich, Dietenhofen, all of Germany

[73] Assignees: LuK Getriebe-Systeme GmbH, Buhl/Baden; AFT Atlas Fahrzeugtechnik GmbH, Werdohl; LuK Fahrzeug-Hydraulik GmbH & Co. KG, Bad Homburg v.d.H.; Temic Telefunken Microelectronic GmbH, Heilbronn, all of Germany

[21] Appl. No.: 08/836,847
[22] PCT Filed: Sep. 12, 1996
[86] PCT No.: PCT/DE96/01755
§ 371 Date: Oct. 23, 1997
§ 102(e) Date: Oct. 23, 1997
[87] PCT Pub. No.: WO97/10456
PCT Pub. Date: Mar. 20, 1997

[30] Foreign Application Priority Data

Sep. 12, 1995 [DE] Germany ............... 195 33 640

[51] Int. Cl.⁷ ............... B60K 41/22; F16D 33/00; F16H 59/00
[52] U.S. Cl. ............... 192/3.58; 192/3.3; 74/335
[58] Field of Search ............... 192/3.3, 3.58, 192/30, 30 W, 3.61, 3.62, 109 F; 74/335, 336; 477/70, 79, 80, 86, 180

[56] References Cited

U.S. PATENT DOCUMENTS

| | | | |
|---|---|---|---|
| 4,766,774 | 8/1988 | Tamai | 74/335 X |
| 5,029,678 | 7/1991 | Koshizawa | 477/80 X |
| 5,040,653 | 8/1991 | Vukovich et al. | 192/109 F X |
| 5,674,155 | 10/1997 | Otto et al. | 192/3.3 X |
| 5,726,889 | 3/1998 | Shinojima | 74/335 X |
| 5,836,207 | 11/1998 | Spooner et al. | 74/335 |
| 5,893,292 | 4/1999 | Lanting | 74/335 |
| 5,992,590 | 11/1999 | Harries | 192/3.58 |

FOREIGN PATENT DOCUMENTS

| | | |
|---|---|---|
| 0142221 | 5/1985 | European Pat. Off. . |
| 0316869 | 5/1989 | European Pat. Off. . |
| 0378218 | 7/1990 | European Pat. Off. . |
| 4320353 | 1/1984 | Germany . |
| 07208595 | 8/1995 | Japan . |
| 9623674 | 8/1996 | WIPO . |

*Primary Examiner*—Charles A Marmor
*Assistant Examiner*—Roger Pang
*Attorney, Agent, or Firm*—Darby & Darby

[57] ABSTRACT

The friction clutch between the engine and an automated transmission in the power train of a motor vehicle are operated and controlled by an actuator which effects changes in the extent of engagement of the clutch as well as the selection of and shifting into particular gears. The actuator forms part of a unit which receives a pressurized hydraulic fluid from a source including an accumulator and a proportional valve which latter selects the fluid pressure necessary to shift the transmission into a selected gear.

36 Claims, 24 Drawing Sheets

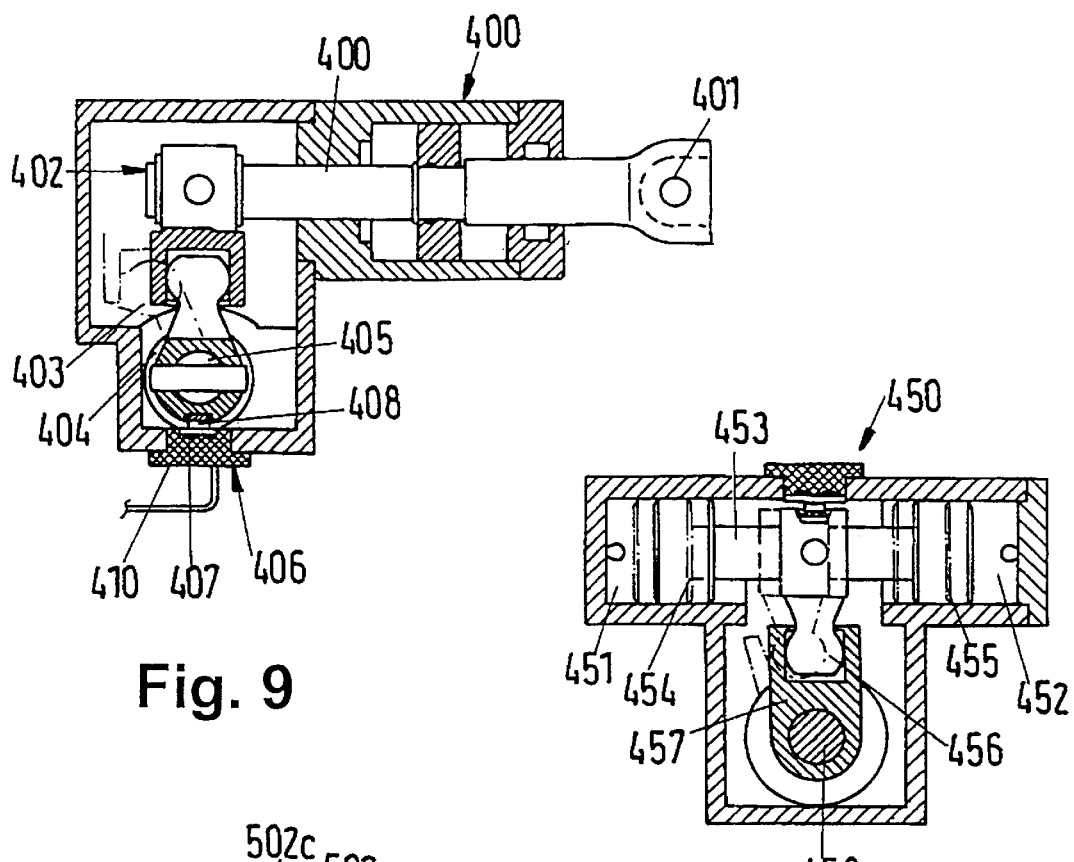
Fig. 9
Fig. 10
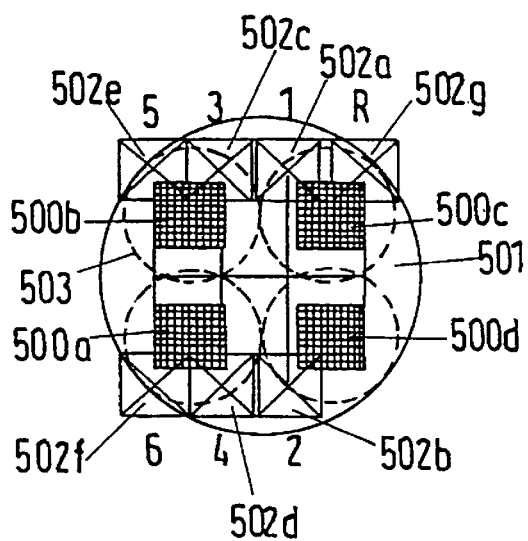
Fig. 11
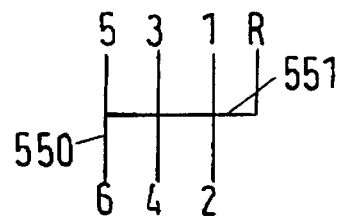
Fig. 12

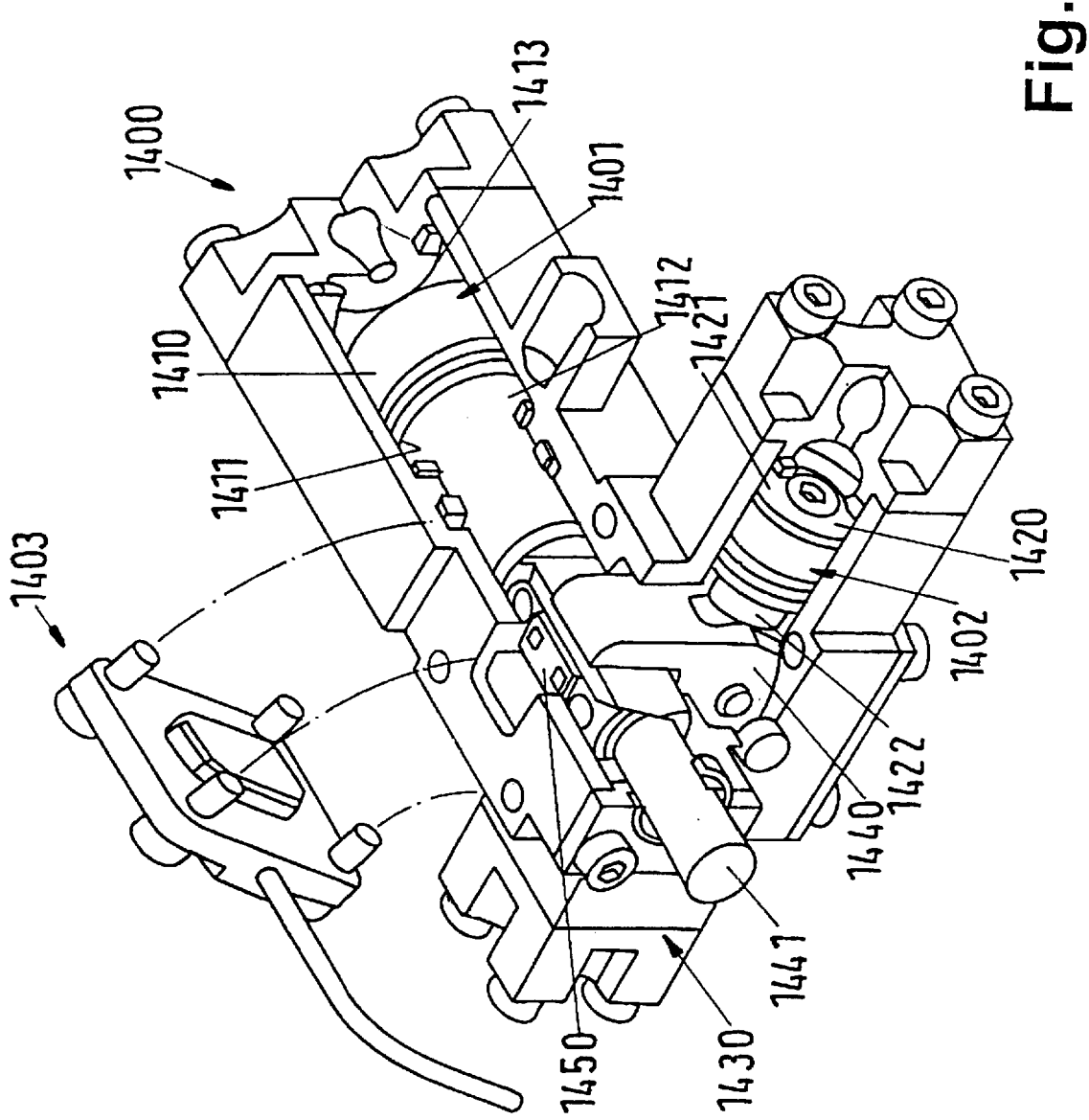

METHOD OF AND APPARATUS FOR ACTUATING THE TORQUE TRANSMITTING SYSTEM AND THE TRANSMISSION IN THE POWER TRAIN OF A MOTOR VEHICLE

BACKGROUND OF THE INVENTION

The invention relates to a motor vehicle with an engine, a transmission and torque transmitting system which is disposed in the path of torque transmission between the engine and the transmission, with an actuating unit for the initiation of the clutching operation and of the shifting and selecting operation for the carrying out of an automated change of gear.

The carrying out of a change of gear in motor vehicles is performed in part manually by the driver, and such change of gear is carried out by hand by means of an actuating lever, such as a shifting lever.

There also exist automatic transmissions which, in comparison with a shift transmission, such as a range transmission, are of a more complicated and more expensive design entailing a considerable increase in the cost of the transmission. Such automatic transmissions can carry out an automatic change of gear in response to hydraulic actuation of brakes and clutches.

OBJECTS OF THE INVENTION

The object underlying the invention is to provide an automated shift transmission which carries out a gear change in a range transmission in response to a command from the driver or in a fully automatic way. Another object underlying the invention is to render it possible to put to use those transmissions which are employed as manually actuated shift transmissions to operate as automated shift transmissions, preferably with only minor changes or without changes.

Another object is to provide an actuator for the carrying out of the shifting, selecting and clutching operations which actuator permits a convenient change of gears but is nevertheless optimized as far as the number of its parts is concerned and can be produced at a reasonable cost.

A further object is to provide an integrated actuator which essentially encompasses the required adjusting means and sensors.

SUMMARY OF THE INVENTION

In accordance with the invention, this is accomplished in that an actuating unit is supplied with a pressurized medium by a hydraulic unit having a hydraulic pump and, if necessary, an accumulator, to effect a planned initiation of a gear shifting operation. The actor unit comprises at least one adjusting member, and the hydraulic unit comprises valves and connections for hydraulic fluid which are actuated to effect a controlled initiation of the shifting and selecting operation. The hydraulic connections are provided primarily between the valves, respectively between the valves and the adjusting members.

In accordance with the invention, this can also be accomplished in that the actuating and hydraulic unit comprise a first section wherein a proportional valve selects a fluid pressure for shifting by means of an adjusting member and at least one valve which is installed downstream of the proportional valve selects the direction of shifting, and a second section wherein a proportional valve selects a fluid pressure for the actuation of the torque transmitting system by means of an adjusting member and, if necessary, for the selection by means of an adjusting member, at least one valve which is installed downstream of the proportional valve being utilized to initiate the selection.

It can be of advantage if the actuating unit and the hydraulic unit form a structural entity; however, the hydraulic pump and/or the accumulator need not necessarily belong to such structural entity but can be mounted separately.

It can also be of advantage if the actuating unit and the hydraulic unit are mounted separately and are connected to each other by fluid conduits. Thus, a valve block can be installed separately of an actuating block with adjusting members. Still further, it can be of advantage if the adjusting member for the actuation of the clutch is not installed in the actuating unit. The sensorics can be received in or mounted on the actuating unit or in a hydraulic unit or at the adjusting members. The member for the actuation of the clutch can be directly connected with the valve block. Furthermore, a piston which is interposed for example for liquid separation or for monitoring the actuation of the clutch can be installed between the adjusting member and the valve block.

Still further, it can be of advantage if the actuating unit and/or a hydraulic unit contains or comprises those adjusting members and valves and hydraulic fluid connections which must be actuated for the controlled carrying out of the shifting and selecting operations. Analogously, it can be of advantage if the actuating unit and/or the hydraulic unit comprises at least one valve which is actuated to initiate the disengagement of the torque transmitting system, a fluid conveying connection being established between a clutch slave cylinder which is disposed in the region of the clutch and the at least one valve which is disposed in the actor.

Basically, it can be of advantage if the actuating unit and/or the hydraulic unit contains at least one sensoric unit which monitors the clutch actuating movements and/or the gear shifting or gear selecting movement. The arrangement can be such that the sensoric unit of the actuating unit can monitor the gear shifting and selecting operations, and the sensoric unit of the hydraulic unit monitors the clutch actuating operation.

Furthermore, it can be of advantage to provide in the actuating unit at least one sensoric unit for the monitoring of the gear shifting and selecting operation. Analogously, it can be of advantage if a first sensoric unit for the monitoring of the clutch actuating movement and a second sensoric unit for joint monitoring of the gear shifting and selecting movements are integrated into or received in the actuating unit and/or in the hydraulic unit and/or in a fluid connection. It can be of particular advantage if discrete sensoric units are respectively integrated into the hydraulic unit to monitor the clutch actuating movements, and into the actuating unit to monitor the gear shifting and selecting movements.

Moreover, it can be of advantage in an embodiment of the novel actuator to employ, for the actuation of each of the adjusting members for clutching, gear shifting and gear selection a discrete proportional valve and, if necessary, a relay valve installed downstream of the respective proportional valve.

In accordance with the invention, it can be of advantage if, for the purposes of actuating the adjusting members for the clutching, gear shifting and/or gear selection, the actuation of at least one of the adjusting members involves the utilization of a proportional valve and, if necessary, relay valves downstream of the proportional valve.

It can also be desirable if, in connection with the actuation of adjusting members for clutching, gear shifting and/or gear selection, a proportional valve and, if necessary, a relay valve downstream of the proportional valve are provided for the actuation of at least one adjusting member and at least one relay valve is utilized for the actuation of at least one other adjusting member.

It can be particularly advantageous if at least one proportional valve is employed for the actuation of each of the adjusting members for the clutching, gear selection and gear shifting, it being preferred to utilize a first proportional valve for the clutching and gear selection and another proportional valve for gear shifting and to install, if necessary, relay valves downstream of such proportional valves.

Furthermore, it can be of advantage if a proportional valve regulates the pressure for the transmission of transmissible torque by the clutch and, once the clutch is disengaged, to employ at least one downstream relay valve to also regulate the gear selecting operation with the pressure which has been selected by the proportional valve. The regulation of the gear selecting operation exhibits the advantage that it is not absolutely necessary to employ regulated valves for the gear selecting operation. By resorting to energy storing elements which are provided in the transmission, and by relying upon the resulting application of force to the transmission actuating element, such as for example, the central shifting shaft, one can achieve a controlled actuation by the adjusting members against the action of the force.

Basically, it can be of advantage in a further embodiment if, for the purposes of initiating he gear selecting operation, a proportional valve regulates the pressure of the hydraulic fluid and two plenum chambers of a differential cylinder are controlled by two relay valves installed downstream of the proportional valve.

In accordance with a further inventive concept, it can be of advantage if, for the purposes of selection, the relay valves control the two plenum chambers of the differential cylinder in such a way that both plenum chambers contain a pressurized fluid or neither of the plenum chambers contains a pressurized fluid or the first plenum chamber contains a pressurized fluid while basically no pressure is maintained in the second plenum chamber or the pressure in the first plenum chamber is basically nil but the second plenum chamber contains a pressurized fluid.

Furthermore, it can be of advantage if the pressure in the two plenum chambers of the differential cylinder is controlled in such a way that one establishes a multistage characteristic for the selection of the gear ratios.

Still further, it can be of advantage if, for the purposes of shifting, a differential cylinder is controlled by a proportional valve and a relay valve installed downstream of the proportional valve. In this connection, it might be desirable if, for the purposes of gear shifting, the at least one proportional valve controls or regulates at least one cylinder pressure.

It can be of particular advantage if at least one proportinal valve is a proportional directional control valve. It can also be of advantage if a proportional valve is a pressure feedback type proportional pressure reducing valve. In this connection, it can be of advantage if the gear selecting operation or the gear shifting operation is initiated with a proportional pressure reducing valve. It can equally be of advantage if the actuation of the clutch is initiated by a proportional directional control valve. A combined initiation of the clutch actuation and of the gear selecting operation is preferably carried out with a proportional pressure reducing valve.

Basically, it can be of advantage if, for the purposes of initiating the gear shifting operation, the two plenum chambers of the differential cylinder are supplied with pressurized fluid by regulating or controlling the pressure in such a way that there develops a pressure-regulated or pressure-controlled force for shifting in one direction or in another direction. In this connection, it can be of particular advantage if the magnitude of the pressure-regulated or pressure-controlled force acting in the one direction matches that of the pressure-regulated or pressure-controlled force acting in the other direction.

It is of advantage to design one embodiment of the invention in such a way that the relay valve which initiates the gear shifting operation of the transmission subjects the first plenum chamber of the differential cylinder to the action of pressurized fluid while the fluid in the other plenum chamber is not pressurized or that both plenum chambers contain a pressurized fluid.

Furthermore, it can be of particular advantage if at least one of the differential cylinders for gear shifting or gear selection contains a piston having opposite sides with axially oriented effective surfaces of different sizes. In this connection, it might be of additional considerable advantage if at least one of the differential cylinders which are utilized for the gear shifting and gear selection contains a piston having opposite sides with axially oriented effective surfaces of different sizes with a surface ratio of 2:1.

In accordance with an advantageous embodiment of the invention, it can be of particular advantage if at least one of the proportional valves is a pressure regulated, particularly a load feedback regulated, proportional valve.

It can be of advantage if at least one of the proportional valves is a pressure regulated, particularly a load feedback regulated, proportional valve and at least one further proportional valve is a proportional directional control valve.

Basically, it can be of advantage if at least one of the proportional valves, namely a proportional valve for clutching and gear selection and a proportional valve for gear shifting, is a pressure regulated valve, particularly a load feedback valve.

Furthermore, it can be of advantage in accordance with an embodiment of the invention if the clutch actuating operation is regulated as a function of the extent of movement and/or pressure or is controlled as a function of pressure.

Furthermore, it can be of advantage if the gear selecting operation is regulated as a function of the extent of movement and/or pressure or is controlled as a function of pressure.

In accordance with a further embodiment of the invention, it is of advantage if the gear shifting operation is controlled or regulated as a function of the extent of movement, and to carry out an additional, slave, pressure regulation or pressure control, particularly in the course of the synchronization stage of the gear shifting operation.

It is of advantage if the gear shifting operation is controlled or regulated as a function of pressure.

Furthermore, it can be of advantage if the differential cylinders for the selection or shifting are operated by relay valves and the fluid pressure for the shifting or selection is controlled or regulated by means of proportional valves upstream of the relay valves. The proportional valves which are installed in the path of fluid flow upstream of the relay valves exhibit the novel advantage that they can be designed for a lower rate of fluid flow therethrough and the relay valves must be designed for a higher volumetric flow. This renders it possible to employ relatively inexpensive proportional valves and this advantage is not cancelled by potential higher cost of the relay valves. On the other hand, if the proportional valve is located in the path of fluid flow downstream of the relay valve, as considered in a direction toward the consumer, the proportional valve must be designed for the high volumetric flow.

In accordance with an advantageous embodiment of the invention, it is desirable if the controlled or regulated fluid pressure for actuation of the clutch is also put to use to actuate the gear selecting cylinder.

Moreover, it can be of particular advantage if the fluid pressure for the initiation of the gear selecting operation is monitored in the hydraulic layout or in the hydraulic unit downstream of the proportional valve which controls the clutch.

It can equally be of advantage if the fluid pressure for actuation of the gear selecting cylinder, such as for the initiation of the gear selecting operation, is generated by a discrete pressure regulating valve, especially a load pressure feedback regulating valve.

In accordance with another inventive concept, it is advantageous if a vehicle comprises an engine, a transmission, such as a range transmission, and a torque transmitting system, such as a clutch, in the torque transmitting path between the engine and the transmission, a central control unit and a hydraulic unit with a hydraulic pump and, if necessary, with an accumulator and valves and an actuating unit, such as an actuating unit, which can comprise adjusting members and, if necessary, valves for the initiation of the selection of and shifting into a gear ratio in the shifting categories of the transmission, and an adjusting member serving to control the clutch and being controlled in such a manner that the actuation of the adjusting members takes place at least in part serially.

It can be of advantage if the clutch actuation (K), the shifting operation (S) and the selecting operation (W) take place at least in part serially. It can be desirable if the procedure K-S-W-S-K takes place entirely serially or the operation K-S and/or S-K, as well as possibly S-W and W-S, take place at least in part in parallel, such as at the same time.

Furthermore, it can be of particular advantage if the hydraulic unit and/or the actor unit for the initiation of the shifting and selecting operations and for actuation of the clutch can be provided on, such as attached to, as auxiliary equipment, a normally manually operated range transmission.

In accordance with a further inventive concept, it is of particular advantage in relation to a sensoric unit if the latter is equipped with a movable means and a fixedly mounted means, the movable means comprising a transmitter and the fixedly mounted means monitoring the position of the movable means relative to the fixedly mounted means, the sensoric unit being disposed at/in an actuating unit to directly or indirectly monitor the movement of an element of the transmission in the course of a gear selecting or gear shifting operation.

Still further, it can be of advantage if the movable means is movable unidimensionally or twodimensionally or threedimensionally.

An embodiment is preferably designed in such a way that the movable means is movable in a plane or on an arcuate surface, such as for example, the external surface of a cylinder.

Furthermore, it can be of advantage if the movable means is movable along a straight or curved path.

Moreover, it can be of particular advantage if the sensoric unit monitors the position of the movable means in a contactless fashion or as a result of contact.

Moreover, it can be of advantage if the fixedly mounted means comprises a spatial arrangement of sensors which generate signals in dependency upon the position of the movable means.

Moreover, it can be of advantage if the fixedly mounted means comprises at least one sensor which generates a signal in dependency upon the position of the movable means.

Still further, it can be of advantage if the fixedly mounted means comprises a spatial array of Hall generators or other contactless sensors.

Furthermore, an embodiment of the invention can advantageously be designed in such a way that the fixedly mounted means comprises a rectangular or square or triangular or linear array of at least two Hall generators or other contactless sensors.

Accordingly, it is desirable that the movable means comprise at least one magnet or another contactless transmitter.

It can be of advantage if the contactless sensors or Hall generators are disposed on a plane or on an arcuate surface or in a straight or arcuate path.

Accordingly, it can be desirable that the fixedly mounted means is a track or a surface of a potentiometer and the movable means is a sliding contact of a potentiometer.

It can be of advantage if the movable means is a track or a surface of a potentiometer and the fixedly mounted means is a sliding contact of a potentiometer.

In accordance with a further modification of the invention, it can be of advantage that, based on the signals generated by the sensors, the control unit ascertains the position the movable means assumes relative to the fixedly mounted means, particularly for the detection of an actual shifting and/or selecting stage and/or for the basically continuous monitoring of the means which are provided to perform the shifting and/or selecting operation.

It can be of advantage if the control unit transforms the signals from the individual sensors into a matrix representation, the analog signals from the sensors being converted into digital values and each position which the movable means assumes as well as the path of the movable means is quasi continuously represented by the matrix values.

In accordance with the invention, it can be desirable that the control unit provide, for each position of the movable means, a matrix value which is formed by the individual measurement values of sensor signals from the individual sensors.

Furthermore, it can be of advantage if a twodimensional resolution of the sensoric unit is carried out by a spatial arrangement of basically unidimensionally acting sensors.

In accordance with a further inventive concept, it can be of advantage in connection with a method for the regulation or control of an automated shift transmission, such as a range transmission with a control unit, an actuating arrangement and sensors for the detection of the operating condition, if the initiations of the clutching operation and of the gear selecting operation take place serially, it being preferred to employ a common pressure regulating valve.

Furthermore, it can be of advantage if the initiations of the clutching, shifting and selecting operations take place serially.

Still further, it can be of advantage that the initiation of the shifting operation take place independently of the serial initiation of the clutching and selecting operations.

It is of particular advantage that the shifting operation and the serial clutching and selecting operations take place simultaneously, at least in part.

In accordance with a further inventive concept, it is of advantage if, in a method of automatically shifting gears in range transmissions, a change of gear is initiated in response to depression of a knob, such as manually, or in a fully automatic way.

In accordance with a further inventive concept, it can be of particular advantage if, depending upon the position of the switch, a change of gear take place in a highly comfortable manner and in a particularly sporty manner as a result of shifting in accordance with a driver's desire.

In this connection, it can be of advantage that, in the course of a comfortable gear shift, the synchronizing operation during shifting can be carried out with a force smaller than that required for a comfortable sporty gear shift.

In accordance with a further inventive concept, it is of advantage if a motor vehicle having an engine, a transmission and a torque transmitting system, such as a clutch, in the torque transmitting path between the engine and the transmission, with a hydraulic unit which comprises a hydraulic pump and at least one valve for the actuation of a hydraulic cylinder serving to control the torque which can be transmitted by the clutch along an actuating path, such as a disengagement path, is designed in such a way that the disengagement movement of the clutch is monitored by an arrangement which is installed in a fluid-conveying connection to the adjusting member for the clutch and comprises a piston which denotes the disengaging movement or the stage of disengagement by its position relative to a sensor.

Furthermore, it can be of advantage to provide an arrangement with a piston which is axially movable in a housing and, if necessary, is spring biased at least at one of its sides and, if necessary, such springs are installed in the housing, a pressurizable chamber being provided ahead of and behind the piston as seen in the axial direction and being provided with hydraulic connections, a sensor being provided to monitor the axial position of the piston. A controlled actuation of the clutch effects an axial displacement of the piston, such as a sensor piston.

Furthermore, it can be of advantage if an arrangement is assembled in such a way that the arrangement is provided with a housing and a plenum chamber at the input side as well as a plenum chamber at the output side. An axially displaceable piston separates the two plenum chambers from each other and the arrangement is disposed in a fluid connection. An actuation of a downstream adjusting member brings about an axial displacement of the piston and a sensor, which is provided at or in the housing, monitors such movement of the piston.

It can be of advantage to provide in the housing energy storing elements which act upon the piston in the axial direction and center it in the unpressurized condition.

Furthermore, it can be of advantage to provide the housing with a snifting bore for a planned pressure equalization, such snifting bore communicating with the sump of the hydraulic unit by way of a fluid connection.

Still further, it can be of advantage if a sensor for the monitoring of the position of the clutch is a contactless sensor, such as for example a Hall generator.

It can also be of advantage if the displacement of the disengaging bearing of a clutch is monitored by a resiliently flexible means which extends into the transmission bell from the outside and abuts the disengaging bearing essentially in the axial direction, the bending of the flexible means being monitored by a sensor.

In this connection, it can be of advantage if the resiliently flexible means is clamped, such as held, in a base plate and such base plate is secured to the exterior of the transmission.

Furthermore, it can be of advantage if the sensor is a strain gauge or a piezoelectric sensor or another contactless sensor, such as a Hall generator.

In accordance with a further inventive concept, it can be of advantage if a throttle valve or a flow restrictor is installed upstream of the relay valves for the initiation of a gear selecting operation.

It can equally be of advantage if a throttle valve or a flow restrictor is installed downstream of an accumulator.

Moreover, it can be of advantage to provide a throttle valve or a flow restrictor in a conduit for a pressurized fluid, such as a hydraulic conduit.

BRIEF DESCRIPTION OF THE DRAWINGS

The invention will be explained in greater detail with reference to the FIGS. 1 to 29. There are shown in:

FIG. 29 an actuator block.

DESCRIPTION OF PREFERRED EMBODIMENTS

Figure 1:
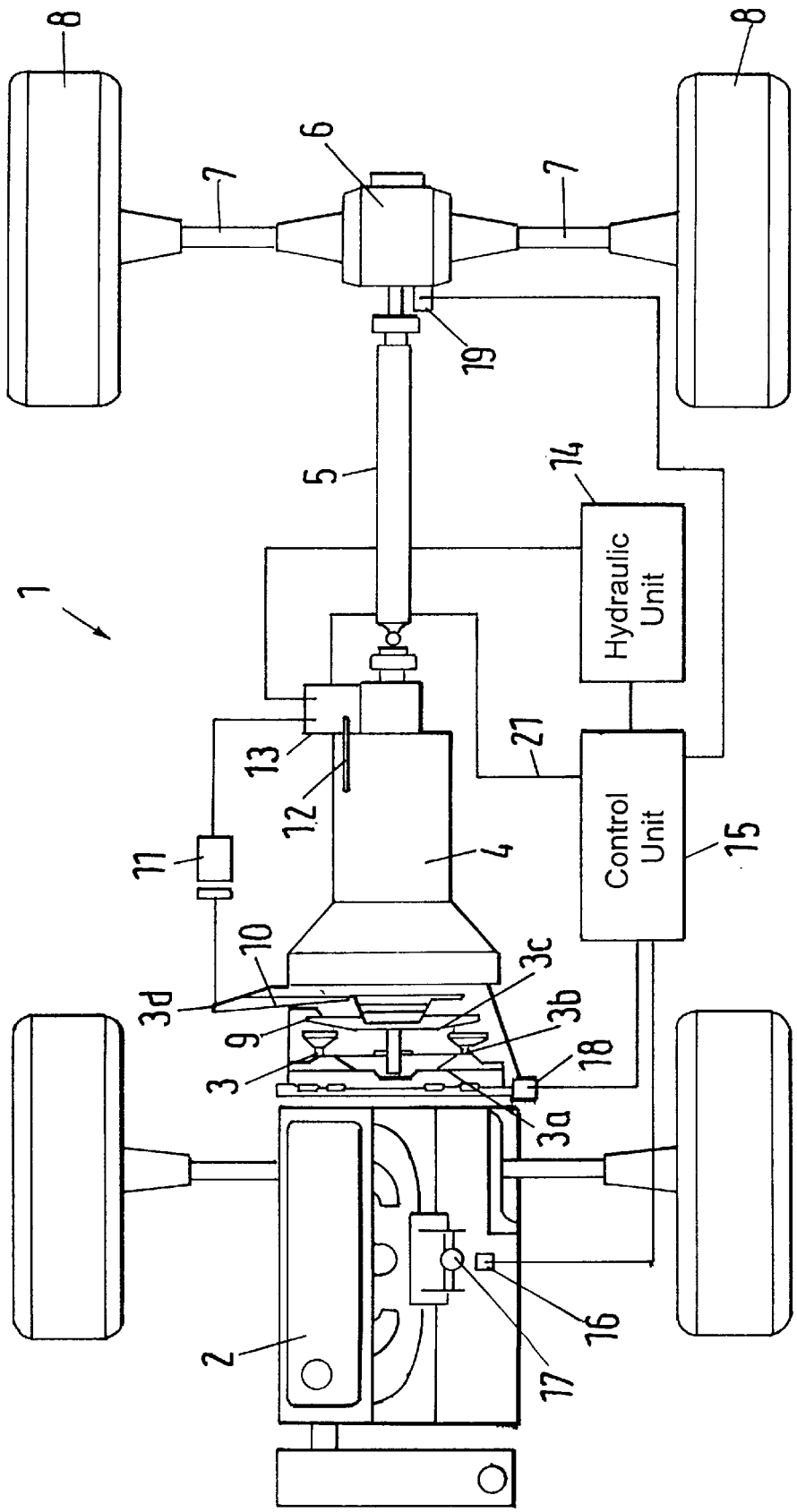
FIG. 1 a schematic representation of a vehicle.

FIG. 1 shows a vehicle 1 with a driving unit 2, such as a combustion engine, with a torque transmitting system 3 and a following transmission 4. The drive shaft or cardan shaft 5 is driven by the transmission 4 and is coupled with the drive shafts 7 and with the driven wheels 8 by way of a differential 6. The torque transmitting system 3 consists essentially of a flywheel 3a, a clutch disc 3b, a diaphragm spring 3c, a clutch cover and a disengaging mechanism 3d. The disengaging mechanism 3d can consist of a hydraulic central disengaging member or of a mechanical disengaging member with mechanical actuation, such as a disengaging member with a disengaging fork, the actuation of the mechanical disengaging lever, such as a disengaging fork, being initiated by a slave cylinder. In FIG. 1, there is shown a disengaging bearing 9 which is actuatable by way of a disengaging fork 10, the movements of the disengaging fork 10 being initiated by a slave cylinder 11. As shown, the torque transmitting system 3 can constitute a friction clutch with or without an adjusting mechanism which compensates for wear. Furthermore, the torque transmitting system can constitute a magnetic powder clutch or the bypass clutch of a hydrokinetic torque converter.

The transmission 4 is a conventional shift transmission comprising internal shifting elements and being shifted by way of a central shifting shaft 12 or shifting rods. The transmission can be designed as a transmission with an interruption of pulling force.

The embodiment of FIG. 1 comprises an actuating unit 13, such as an actuator unit, which includes a hydraulic or hydrostatic block, if necessary with valves and hydraulic fluid conduits and adjusting cylinders which carry out an actuation of the transmission operating element 12. The actuating unit 13, such as an actuator unit, can also be connected with a hydraulic unit 14 which comprises a hydraulic aggregate with a hydraulic pump and a tank and/or a reservoir, such as an accumulator. The hydraulic unit 14 can be divided into several subunits which can be installed in advantageus positions in the vehicle depending upon the required space therefor.

The hydraulic unit 14 can be divided into subunits. For example, the subunit including a hydraulic pump with motor can be replaced with a hydraulic pump which is provided in the vehicle in such a way that a common hydraulic pump services several hydraulic elements. For example, such a pump can constitute a pump of the power steering mechanism.

Analogously, the actuating unit 13 and the hydraulic unit 14 can constitute a structural unit. However, in such instance and if necessary, at least some discrete adjusting members, such as for example for actuation of the clutch, and discrete hydraulic elements, such as for example a pump, cannot be integrated into the hydraulic unit.

Furthermore, there is made available a control unit 15 with a central computer unit which processes the incoming signals and transmits control signals to the actuating arrangement 13 and/or to the hydraulic unit 14 with the adjusting members. For example, the control unit 15 can comprise a central computer unit which initiates, in dependency upon the operating point, the control of the clutch actuation and the actuation of the transmission, such as the automated gear change of the transmission 4.

The control unit 15 is in signal transmitting communication with sensors, such as for example a throttle valve sensor 16, the throttle valve 17 of the driving aggregate 2, as well as with RPM sensors 18, tachometer sensors 19 and gear recognition sensors which can be installed, for example, in the actuating unit 13. The control unit 15 further comprises a CAN bus interface by means of which the control unit is in signal transmitting communication with other control units so that, for example, the engine electronics can transmit to the control unit signals denoting the engine torque.

Figure 2:
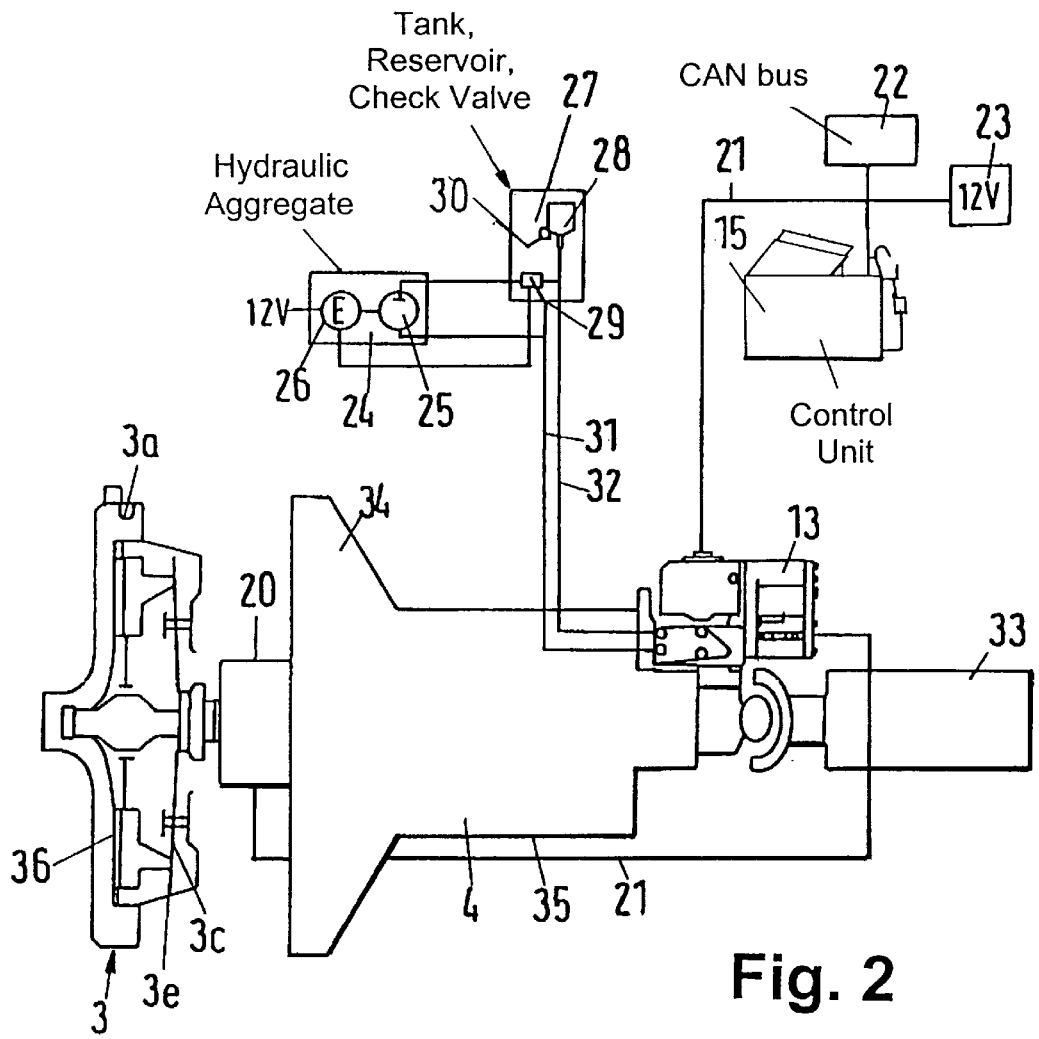
FIG. 2 a schematic representation of an automated shift transmission.

The FIG. 2 shows the transmission 4, the torque transmitting system 3, such as a friction clutch, with a flywheel 3a, the clutch disc 3b, the diaphragm spring 3c, the clutch cover 3e and a hydraulic central disengaging member 20. The hydraulic central disengaging member 20 is supplied with hydraulic fluid and fluid pressure by a supply conduit 21, such as a compressed fluid conduit, which is operatively connected to the actuating unit 13. The actuating unit 13 is secured to the transmission 4 and receives at least the end portion of the central shifting shaft of the transmission so that the internal adjusting members of the actuating unit can move the shifting shaft of the transmission in the axial direction as well as in the circumferential direction whereby the central shifting shaft can be moved or actuated in accordance with an H- or double-H gear shifting scheme in order to select the required gear positions within the transmission. In this manner, one can initiate an automated gear change.

The actuating unit 13 is in signal transmitting communication with the control unit 15 by at least one data transmitting conduit 21 which, if desired, can constitute a harness with various data transmitting and current conveying conduits. There is further shown the CAN-bus interface 22 as well as a current source 23 which supplies current/voltage to the control unit 15 and to the actuating unit 13.

The hydraulic unit 14 of FIG. 1 is divided in FIG. 2 into two subunits of which the subunit 24 encompasses the hydraulic aggregate with pump 25 and the electric motor 26 for the pump. The further subaggregate is constituted by the tank- and accumulator unit 27 which includes a pressure accumulator 28 and a pressure relief valve 29 as well as a sensor 30 which monitors the pressure conditions in the pressure accumulator to start the hydraulic pump when the pressure drops below a threshold value in order to reestablish the optimum pressure conditions within the accumulator, or to again turn off the hydraulic pump when a preselectable upper threshold is exceeded. The unit 27 is connected with the actuating unit 13, such as an actuator unit, by way of hydraulic conduits 31, 32 so that the actuation of the clutch as well as the selection of gears and shifting of the transmission can be carried out in an automated manner by way of valves which are provided in actuating unit and, if necessary, by way of adjusting members. The actuation is carried out in response to a planned actuation of valves for the application of pressure to the adjusting members by resorting to at least one piston-cylinder unit. FIG. 2 further shows a cardan shaft 33 which is installed at the output side and which transmits torque to the driven shafts.

Figure 2A:
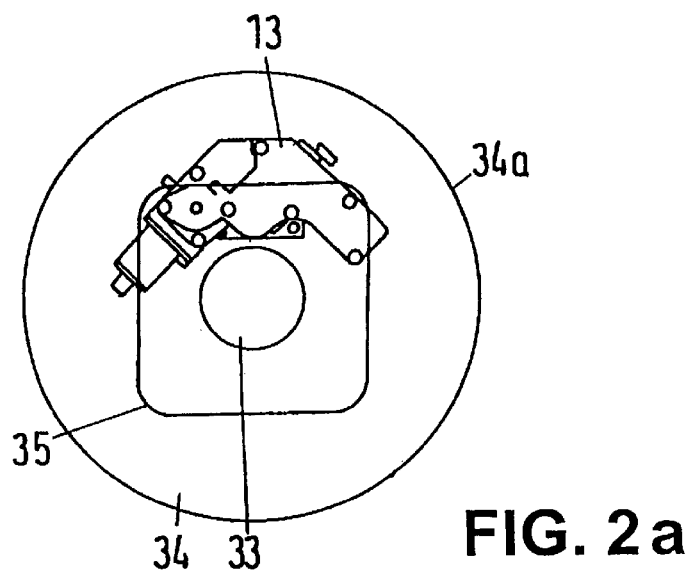
FIG. 2a a view of an actuator.

FIG. 2a is an elevational view of an actuating unit 13, such as an actuator unit, and of the transmission 4 as seen from the locus of the cardan shaft, the large circle 34a denoting the envelope of the transmission bell 34. Furthermore, the basically rectangular outline 35 is established by the outline of the transmission proper, and the actuating unit 13 is flanged, e.g., screwed, basically in the region of the central shifting shaft and surrounds or encompasses the cardan shaft 33, at least in part. In this embodiment, the actuator unit, such as the actuating unit 13, is preferably designed in such a way that it can be installed in the cardan tunnel of a vehicle but, if the situation, as concerns the available space, is altered, the actuating unit 13 can also be constructed in a different way.

Figure 3:
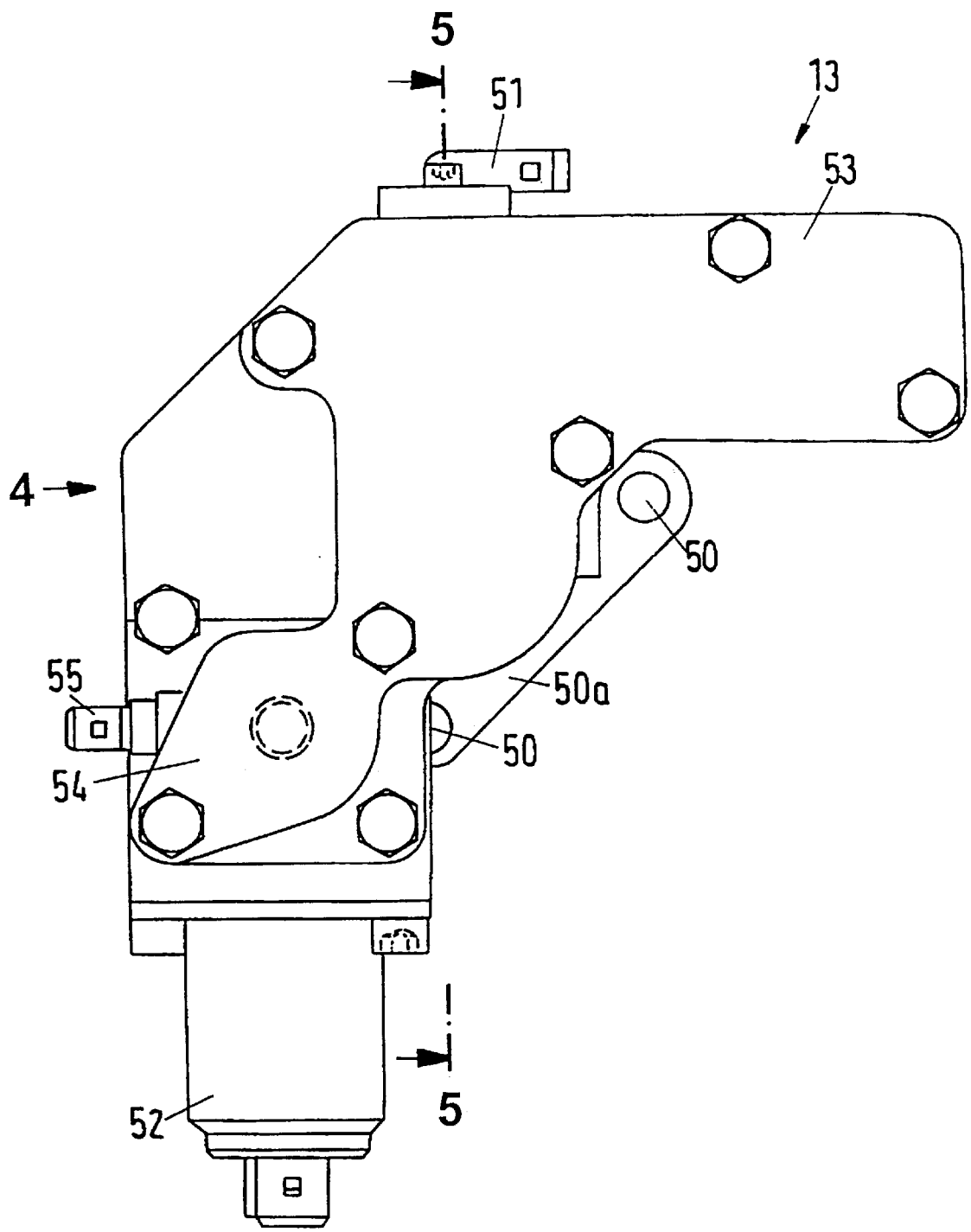
FIG. 3 a view of an actuator.

FIG. 3 is a side elevational view of the actuator 13, such as the actuating unit which is illustrated in FIG. 2a, there being shown the securing openings 50 which are provided in the carrier plate 50a and through which the actuator can be secured to the transmission. There is further shown a plug 51 in a side elevational view, as well as a proportional valve 52, also in a side elevational view. The central shifting shaft is disposed at the central region of the actuator and extends into the actuator from the rear side because it projects from the transmission. The actuator is properly mounted on the transmission and can thus be designed as an add-on solution. The transmission is a conventional shift transmission as known from the art wherein the connection for the shifting lever was removed or was not installed and the actuating 13 is provided to serve as an instrument for automated gear selection. The region 53 within the actuator is taken up by relay valves, and the region 54 is taken up by at least one clutch movement sensor.

The actuating unit, such as actuating unit 13, contains all of the relay- and proportional valves as well as all fluid supplying conduits between the valves and possibly sensors and/or adjusting members, such as adjusting cylinders, which are also received in the housing of the actuating unit, such as actuating unit 13. Furthermore, the actuator also encompasses the sensorics for the determination of the gear setting or gear. Under circumstances, the adjusting members or individual adjusting members can also be disposed outside of the actuating unit.

FIG. 3 further shows an extension 55 which forms part of the clutch movement sensor with sensor piston. This clutch movement sensor is a hydraulically actuated sensor which comprises a housing for a piston and the movements of the adjusting member take place with the movements of the piston. By resorting to a contactless sensor, such as a Hall generator, one can monitor the movements or the positions of the piston. As concerns the sensor piston, reference is to be had to FIG. 23.

Figure 4:
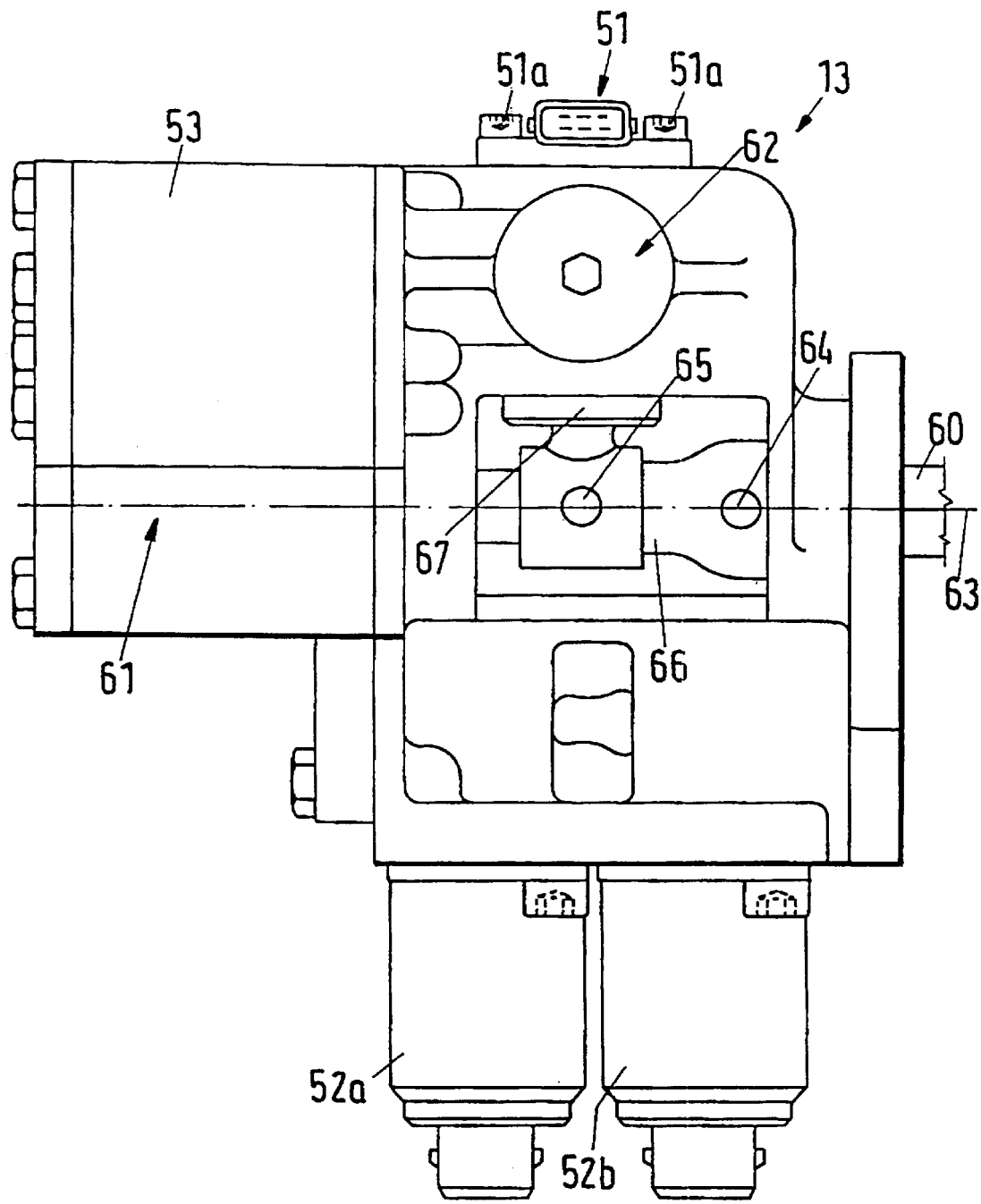
FIG. 4 a view of an actuator.

FIG. 4 illustrates the actuator which is shown in FIG. 3 in a view in the direction of arrow 4. There is shown the manner in which the central shifting shaft 60 of the transmission 4 extends into the actuating unit 13. At the lower end of the actuator unit 13, there are disposed two proportional valves 52a, 52b which serve to control or regulate the pressure of fluid in the hydraulic system. In the region 53, there are again provided relay valves and an adjusting member, such as an adjusting cylinder, is provided in the axial extension 61 of the central shifting shaft. There is further shown, in a front elevational view, the plug 51 which is secured from the outside by means of screws 51a to the housing of the actuating unit 13. In an advantageous manner, such connection can also be established by means of rivets or snap connectors or plug-in connectors. The circular margin 62 denotes in section the arrangement of the second adjusting cylinder 61. In the illustrated region, the adjusting cylinder 61 can cause the central shifting shaft to perform an axial movement or it can initiate such axial movement, the adjusting cylinder 62 being responsible for a rotary movement of the central shifting shaft about the axis 63 or it can initiate such movement.

The purpose of the bolts 64 and 65 is to ensure that the shaft 66 of the actuator can be connected with the central shifting shaft 60 of the transmission unit 4 and that the rocker 67 of the linkage for the actuator of the actuating unit 62 is connectable with the axially shiftable shaft 66.

Figure 5:
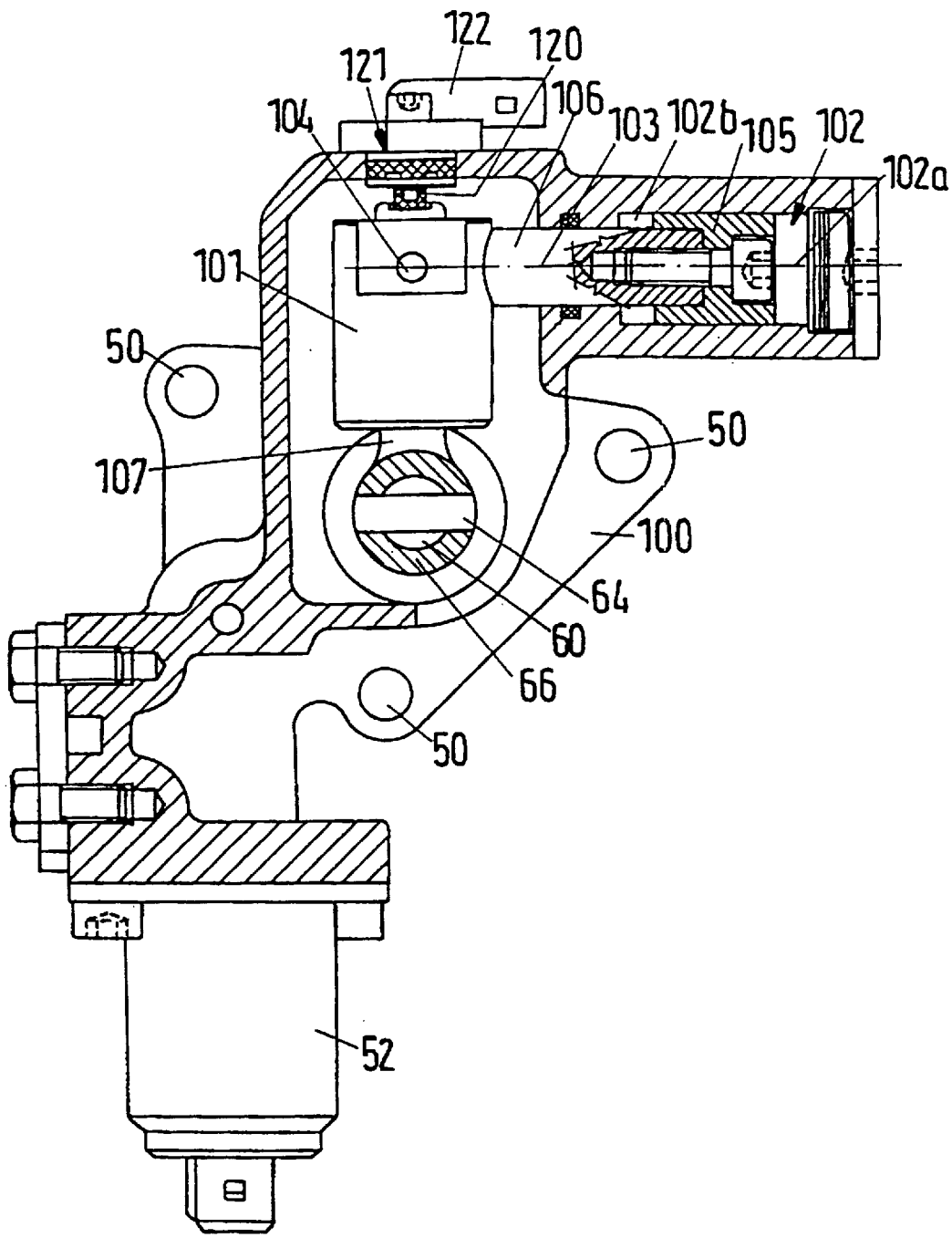
FIG. 5 a sectional view of an actuator taken in the direction of the arrows 5—5 of FIG. 3, FIG. 6 a view of an actuator, FIG. 7 a view of an actuator, FIG. 8 a view of an actuator, FIG. 9 a view of an adjusting member, FIG. 10 a view of an adjusting member, FIG. 11 a view of a sensor arrangement, FIG. 12 a view of a shifting scheme, FIG. 13 a hydraulic diagram, FIG. 14 a hydraulic diagram, FIG. 15 a hydraulic diagram.

FIG. 5 is a sectional view of the actuator in a manner as the latter is shown in FIG. 3, there being further shown the fastening plate 100 with the openings 50 for attachment of the actuator to the transmission. The central shifting shaft 60 can be seen in a sectional view, the same as the pin 64 which connects the central shifting shaft 60 with the shaft 66 of the actuator. Still further, there is shown a guide sleeve 101 which is shiftable in the direction of the axis 103 by means of an adjusting member, such as the adjusting cylinder 102, and is pivotable relative to the joint 104. In this manner, one achieves that, due to axial displacement of the piston 105 of the adjusting cylinder 102, the shaft 106 is adjusted in the axial direction and the guide sleeve 101 is pivoted about the shaft 104 so that the connection which is provided with a spherical head and is installed between the extension 107 of the shaft 66 can be pivoted in response to pivoting of the guide sleeve 101. In this manner, one ensures that, due to an adjustment of the axial position of the piston 105, the central shifting shaft 60 of the transmission can be turned about the axis of the central shifting shaft. In lieu of a joint employing a spherical head, one can also employ a cardan joint or a universal joint.

Thus, a selection of the axial position of the piston 105 of the adjusting member 102 entails the selection of adjustable angular position of the central shifting shaft 60. On the guide sleeve 101, there is provided a sensor element 120, such as a transmitter or magnet, which is pivotable in response to pivoting of the element 101. Directly above the sensor element 120 there is provided a sensor unit 121, such as a slave, which is in signal transmitting communication with the control unit 15 by means of the plug 122. For example, the sensor element 121 can comprise a plurality of Hall generators which are disposed at predetermined distances from each other. Based on the Hall voltages of the individual Hall generator elements, one can ascertan the exact position of the magnet 120.

There is further shown a proportional valve 52 which is utilized to effect a pressure regulation or pressure adjustment of pressure control in the hydraulic system.

In FIG. 5, the two proportinal valves 52a, 52b which are shown in FIG. 4 cannot be seen as two valves because they are disposed one behind the other.

The adjusting member 102 comprises two plenum chambers 102a and 102b which can be put to use in a planned manner in response to a controlled application of pressure which causes the piston 105 of the adjusting member 102 to be acted upon in the axial direction to thus initiate a movement of the central shifting shaft 60.

The adjusting member can constitute a differential cylinder which contains a piston having differently dimensioned sides and serving to separate the plenum chambers 102a and 102b from each other. The differential cylinder is designed in such a way that the pistons or piston sides which are movable in the two plenum chambers have different effective surfaces so that, if the pressure in the two plenum chabers is the same, the surfaces of the piston or pistons are subjected to the action of different forces.

The differential cylinder can be designed in such a way that a discrete piston in movably mounted in each of two plenum chambers which are separated from each other and, for example, these two pistons are coupled to each other by a connection, such as a piston rod. The attachment of the element 101 can be affected by means of such a piston rod, and the point of connection can be disposed axially between the plenum chambers 102a, 102b.

By accurately selecting the relationship of the sizes of the piston surfaces relative to each other or by modulating the supply pressure and, if necessary, by resorting to additional energy storing means, such as springs in the adjusting cylinder, it is possible to modulate the actuating force and to conform it to the mechanical conditions. It is of advantage to resort to a system-dependent end position damping during initiation of operation of the actuating arrangements because the differential force decreases if the hydraulic force remains unchanged and the spring force increases to thus arrive at a condition of equilibrium between the hydraulic compression force and a mechanical counterforce. The result is the same as in the case of end position damping.

In due time, the piston is being acted upon with a constant pressure which is controlled by a pressure regulating valve so that the piston performs a movement in a direction to the right or to the left. At such time, the piston moves against the resistance of an increasing force generated by springs which are installed in the interior of the transmission. Consequently, the piston moves with a constant pressure-generated force against a rising characteristic curve of springs. The difference between such forces decreases and the forces reach a state of equilibrium, i.e., this principle is effective just as an end position damping.

This renders it possible to resort to a simpler regulating algorithm which, in turn, renders it possible to increase the velocity of the system.

Figure 6:
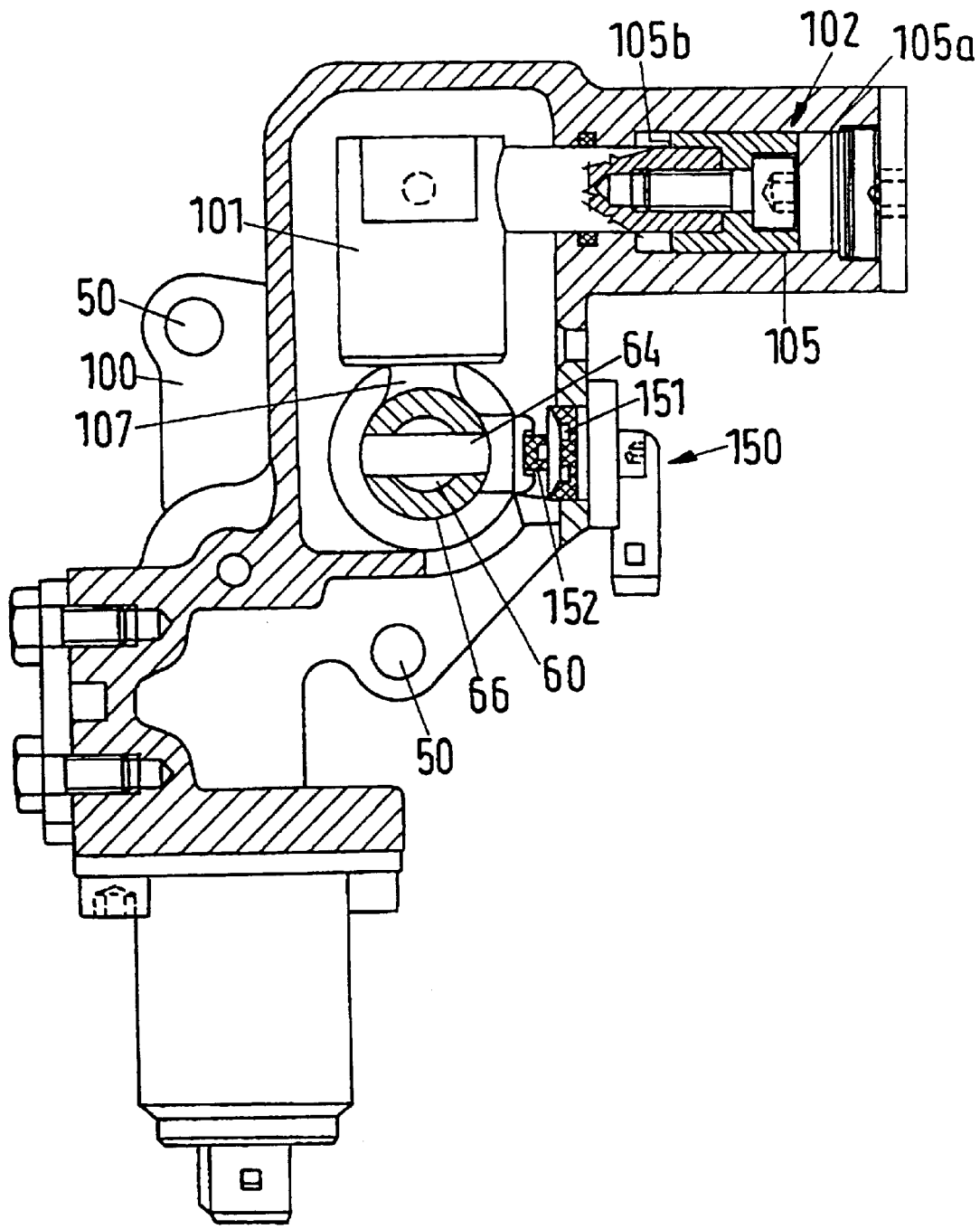

FIG. 6 illustrates a modification of the arrangement of FIG. 5, there being retained the central shifting shaft 60, the shaft 66 of the actuator and the mobile connection by means of the pin 64 as well as the adjusting element 102 with the piston 105 and the connection by means of the guide sleeve 101 and the extension 107 which latter terminates in a spherical head within the guide sleeve, a spherical joint being provided between the guide sleeve 101 and the extension 107. There is also shown the connecting plate 100 with the bores 50 for attachment of the apparatus. A further difference between the arrangement of FIG. 6 and the arrangement of FIG. 5 is that the sensor 150 for monitoring of the position of the axial shifting shaft is located closer to the axis of the shifting shaft to thus facilitate a more direct monitoring of the position of the central shifting shaft because the influence of play and inaccuracies and wear is less pronounced. Furthermore, the sensor consists of a plurality of Hall generators 151 and a magnet 152 provided on a holder which is borne by the shaft 66.

Figure 7:
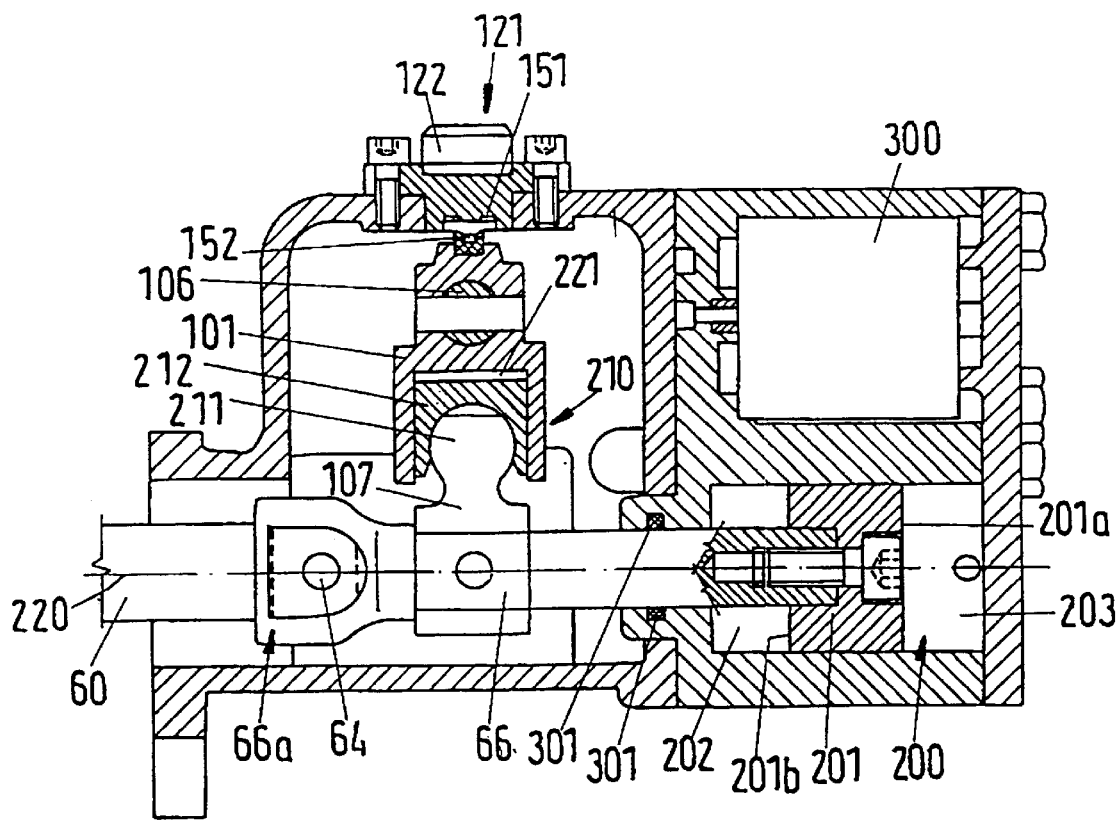

FIG. 7 is a sectional view of an actuating arrangement, the upper part of FIG. 4 being shown in section as seen from the rear side thereof. There are shown in FIG. 7 the central shifting shaft 60 of the transmission 4, the shaft 66 with its receptacle 66a for the actuator, as well as an adjusting member 200 with a piston 201. Axial shifting of the piston 201 due to the pressurization of the plenum chambers 202 and 203 entails an axial displacement of the central shifting shaft 60.

FIG. 7 further shows the spherical joint type connection 210 between the shaft 106 of the adjusting member 102 and the shaft 66, this connection comprising a pivotably mounted guide sleeve 101, a spherical head 211 and a guide 212 for the spherical head 212. The spherical head is connected with the shaft 66 by way of an extension 107.

The spherical head, which is provided on the shaft 66 by way of the extension 106, is guided in a socket of the element 212 so that, when the central shifting shaft 60 is rotated about the axis 220, the element 212 is shiftably mounted in the sleeve 101. Furthermore, a diaphragm spring 221 is disposed between the sleeve and the upper end 212a of the element 212. This energy storing element 221 can also be present in another resilient form. There is further shown in this Figure a sensor 121 with plug 122 and the arrangement of Hall generators 151 as well as the magnet 151. Valves, such as relay valves 300, are disposed in the upper right-hand region.

The shaft 66 of the actuator extends into the space 202 and is sealed by a seal, such as an annular seal 301.

Figure 8:
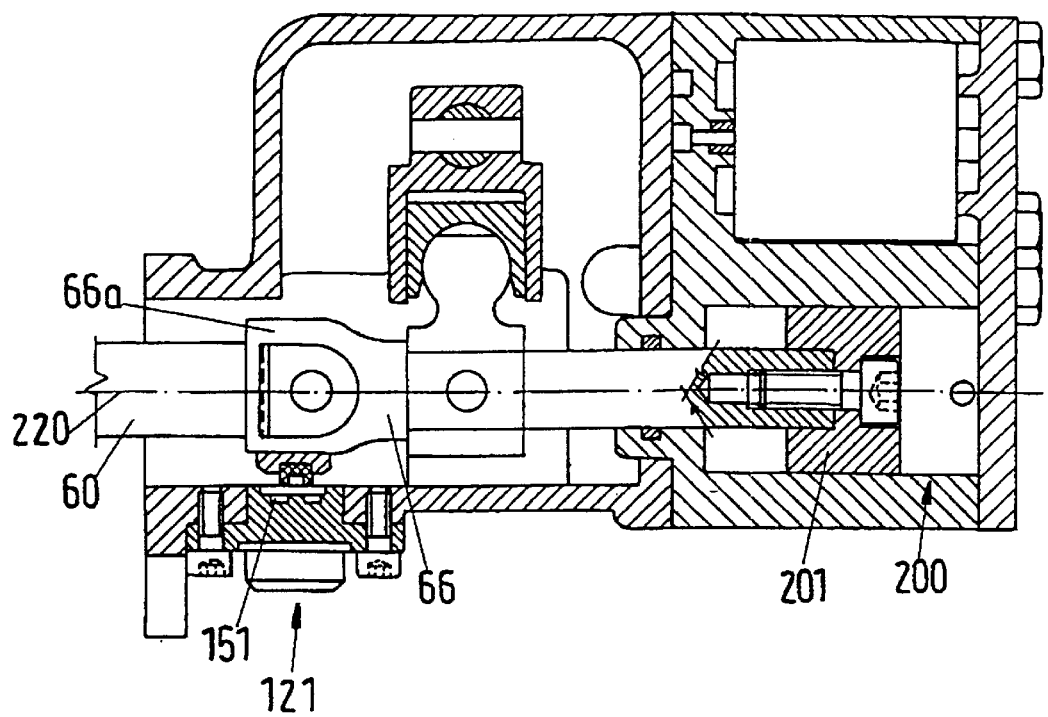

FIG. 8 illustrates a further embodiment which corresponds to that of FIG. 7 but wherein the sensor 121 is disposed in a different region. The magnet is provided directly on the receptacle 66a of the shaft 66, and the receptacle 66a accommodates the end portion of the central shifting shaft 60 of the transmission 4. The axial shifting and/or rotation of the central shifting shaft about its axis 220 thus effects a shifting of the magnet or magnets to a different position which is determined by means of the Hall effect generators 151. In lieu of the magnet, one can also employ a different transmitter.

The adjusting member 102 of FIGS. 5 to 8 constitutes the selecting cylinder because, due to initiation of movement of the piston 105, the central shifting shaft is actuated in a gear selecting direction, Thus, the adjusting member 200 of FIGS. 5 to 8 and its piston 201 constitute the shifting cylinder because, by selecting the axial position of the piston 201, the central shifting shaft 60 is caused to move in the gear shifting direction.

In transmissions with an interchange of directions of shifting and selection, there would also develop a corresponding interchange of actuating directions or actuations.

The pistons 105 and 201 of the adjusting members 102 and 200 constitute differential pistons. This means that the area which can be acted upon in the axial direction is greater at one side of the piston than at its other side. In FIG. 6, the surface 105a is greater than the surface 105b so that, if the pressures applied to the two surfaces are identical, there would develop a resulting force which would cause the piston to move axially in a direction to the left, as viewed in FIG. 6. Analogously, and as far as the piston 201 is concerned, the surface 201a is larger than the surface 201b so that, again, the application of pressure to both plenum chambers 202 and 203 of the adjusting member would result in the generation of a force which would urge the piston 201 axially in a direction to the left.

The arrangement of pistons with side surfaces having areas of different sizes is shown solely as an example.

In transmissions with an interruption of pulling force, different mechanisms can be realized for the shifting into and for the selection of the transmission ratio. Heretofore, the above described embodiment was that of a transmission wherein a central shifting shaft is moved axially or the shifting shaft is moved in a circumferential direction. The adjusting members with the cylinder-piston units are distributed and coupled with the central shifting shaft accordingly.

There are further known transmissions with two rotary shafts, one shaft for shifting and one shaft for selecting. As concerns the selecting cylinder, such shafts are coupled in a manner as described hereinbefore.

There are also known transmissions which are provided with axially movable shifting rods in order to select or to shift into various gears in the individual shifting paths. Such shifting rods can be actuated by resorting to the aforedescribed adjusting means, such as explained for example in connection for the shifting cylinder.

FIG. 9 shows a further embodiment of a shifting cylinder 400 which is equipped with a piston having essentially identical surfaces. There is further shown the shaft 400 with a receptacle 401 for the central shifting shaft. At the other end 402 of the shaft 400, there is provided a guide sleeve 403 which receives a spherical head 404, the latter being connected with the shaft 405 of the selecting cylinder.

Furthermore, there is provided a sensor unit 406 with Hall generators 407 and a magnet 408.

FIG. 10 shows an arrangement including a selecting cylinder 450 with a piston having surfaces of essentially identical size, the plenum chambers 451 and 452 being provided in the end portions of the housing. The plenum chambers 451,452 are bounded by the axially movable pistons 454 and 455. The pistons 454 and 455 are coupled or connected to each other by a connecting rod such as a piston rod. This piston rod is linked to the central shifting shaft by way of a spherical joint or a universal joint. The spherical head 456 of the spherical joint is moved axially in response to axial displacement of the connecting rod 453 between the pistons 454 and 455 with the result that the guide sleeve 457 is pivoted. This causes the central shifting shaft 458 to also turn about its axis.

FIG. 11 illustrates an array of sensors, such as for example Hall generators, 500a to 500d on a carrier such as is shown at 410 in FIG. 9. For example, the carrier 501 can constitute a plastic or metallic part which can be inserted into an opening of the actuator housing so that the introduction of the conductors can be carried out from the outside. Such a sensor arrangement can be very readily inserted and secured, it being possible to provide a threaded, riveted or plug-in connection which results in an inexpensive realization of a local resolution sensor. The squares 502a to 502g denote the positions which can be taken up by a transmitter, such as magnets, beneath 'the array of Hall generators, the gear positions 1, 3 and 5 as well as the reverse gear being disposed in the front end portions of the shifting paths, and the gears 2, 4 and 6 being disposed in the rear end portions. The shifting scheme corresponds to a double-H arrangement of the type shown in a simplified manner in FIG. 12. The vertical lines between the gear positions denote the shifting paths, such as for example the line 550, and the horizontally extending lines 551 are indicative of a gear selecting movement.

A gear position recognition with assistance from the transmitter arrangement, such as an array of Hall generators, can be carried out, with assistance from the electronic control unit, in such a way that one evaluates the Hall generator signals of the individual sensors 500a to 500d, it being possible to employ Hall generators which exhibit a definite spatial sensitivity range as indicated, for example, by circular broken lines 503 surrounding the Hall generators. These spatial sensitivity ranges indicate that a sensor generates a signal, such as a Hall voltage, only when the magnet is disposed within such sensitivity range beneath the sensor. This means that, when for example the sensor at the position 502g is disposed in accordance with a reverse gear, basically only the sensor 500c generates a signal which, basically, departs from zero, and the sensors 500a, 500b and 500d respectively generate signals which do not depart from zero or, at the least, are weak. Analogously, when the transmission is shifted into the first gear, as at 502a, the sensor 500c as well as the sensor 500b generate signals but the two other sensors 500a and 500d basically generate no signals, and so forth, up to the gear position 6 corresponding to 502f in which only the sensor 500a generates a signal.

By appropriate distribution of Hall generators, such as shown in FIG. 11 which illustrates a square array of Hall generators, one can monitor a two-dimensional field by resorting to essentially unidimensional sensors in a twodimensional distribution. Depending upon the structural characteristics of the component part which is to be monitored, it can be of advantage for example if the Hall generators are reduced to a minimum and are secured to the carrier element for example in a triangular or rectangular or square formation.

If the arrangement comprises a single sensor, the latter cannot ascertain for example whether the transmitter is located to the right or to the left of the receiver. Basically, such sensor merely detects the distance. For this reason, such a sensor monitors a "unidimensional value". The cooperation of a plurality of such sensors and the advantageous evaluation of sensor signals render it possible to achieve a two- or threedimensional resolution.

Consequently, the control unit must detect and sample the signals from the individual Hall generators in order to ascertain, for example, the position of the central shifting shaft or, and as shown in the aforedescribed Figures, the control circuit can also serve to ascertain the position or positions occupied by the shafts of the adjusting members, such as adjusting cylinders. As concerns the shaft of the shifting cylinder, it is basically of interest to ascertain, among other things, whether the shaft is located in one of the two end positions, and in which end position, as well as whether the shaft is located in the central neutral position. For example, one can employ two sensors which are installed between the central position and the respective end positions in order to unequivocally ascertain the position of the shaft. In one of the end positions, only one Hall generator having a corresponding sensitivity range is called upon to generate a Hall signal, the other Hall generator serving to generate a Hall signal in the other end position, and both sensors generating Hall signals in the centrally located neutral position.

A corresponding procedure can also be carried out to monitor the position of the selector shaft, an array of 3 or 4 Hall generators being of advantage in connection with a shifting scheme with four shifting paths as shown in FIG. 12.

Figure 13:
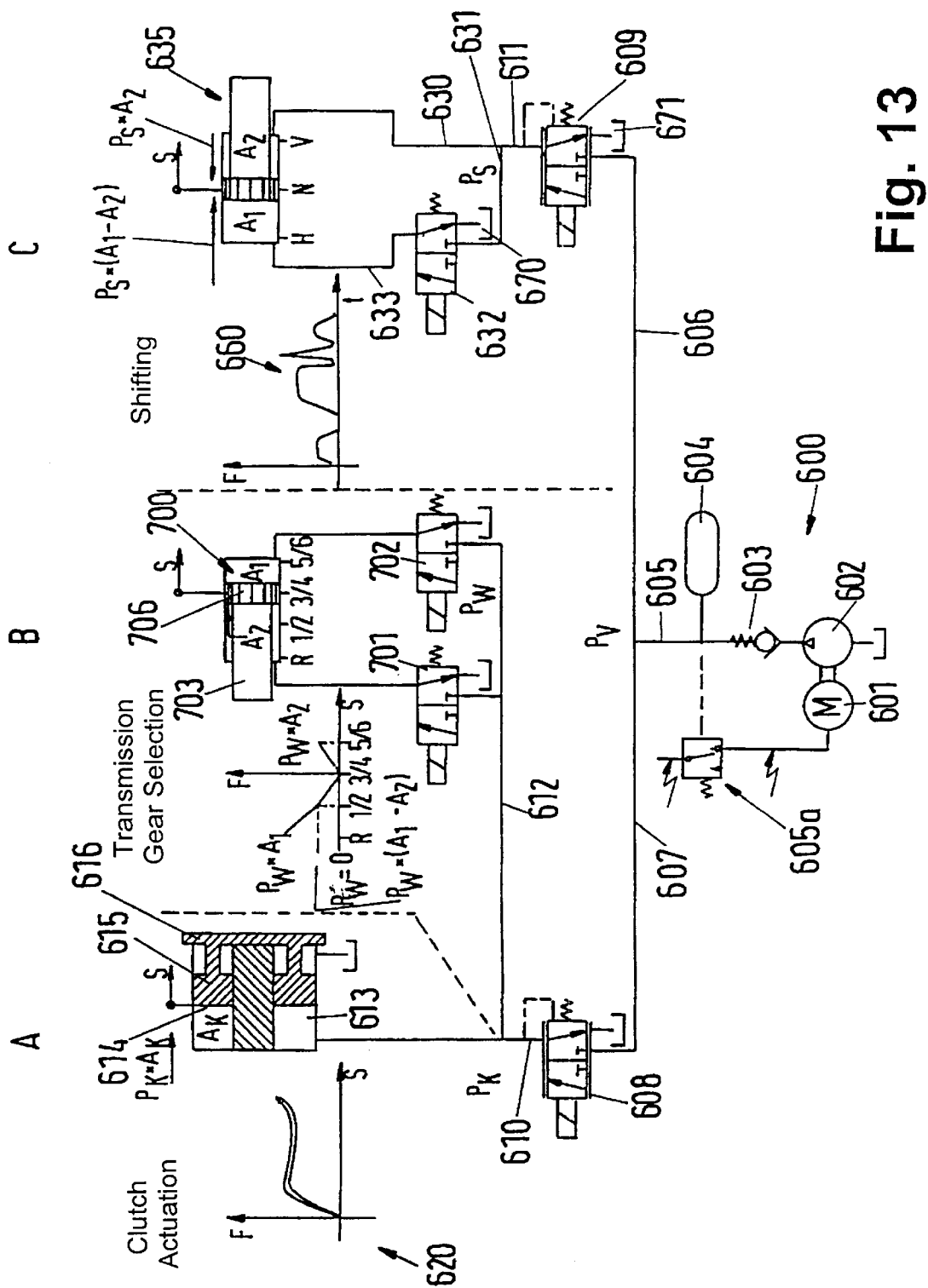

FIG. 13 illustrates a hydraulic layout for automated actuation of the clutch 3 and for the selection of gears as well as for shifting of the transmission 4. Starting from a common pumping unit 600 with an electric motor 601 as well as with a pumping device 602 which is driven by the electric motor, a conduit 603 supplies pressurized fluid to an accumulator 604. The accumulator 604 is connected with a pressure-responsive switch 605a which starts the motor unit and hence the pump when the pressure drops below a preselectable threshold value until the pressure in the accumulator 604 rises above a second preselectable threshold value at which the switch 605a again turns off the motor unit 601. The accumulator 604 and a hydraulic conduit 605 are followed by conduits 606 and 607 for two proportional valves such as pressure feedback proportional valves 608 and 609. As shown in FIG. 13 by two broken lines, the hydraulic scheme or hydraulic layout of FIG. 13 is divided basically into three sections.

A first section A contains the hydraulics for actuation of the automated clutch, a section B contains the hydraulics for the initiation of the gear selecting operation, and the section C contains the hydraulics for 20 the initiation of the gear shifting operation. Starting with a pressure $P_v$, which prevails in the conduits 607 and 606, the pressure in the conduit 610 and in the conduit 611 is controlled or regulated by the pressure feedback proportional valve.

If the transmission is an automated shift transmission, the actuation of the clutch and the initiation of the shifting and selecting operations normally take place in a basically fixed sequence. Prior to a shifting or selecting operation, the clutch must be disengaged at least to such an extent that it is possible to shift out of a gear. Thus, as a rule, the first actuating operation involves a disengagement of the clutch. The second actuating operation can be said to constitute a shifting out of a particular gear, thereafter a selecting operation can entail a change of path but this is optional, and the clutch is thereafter reengaged or is actuated in a planned manner in such a way that it is set for the transmission of a transmissible torque.

In accordance with the aforementioned sequence, the clutch is actuated in a first step, the pressure feedback proportional valve 608 is used to set the pressure $P_K$ in the region 610 in such a way that the pressure in the plenum chamber 613 of the disengaging member is selected in a planned fashion. Depending upon the area $A_K$ of the side 614 of the piston 615, and upon the selected pressure, the disengaging bearing 616 is acted upon with a corresponding force $P_K{}^*A_K$ in the direction of disengagement. The force F which is required by the actuator is shown in the diagram 620 as a function of the extent of clutch disengaging movement S.

Thus, the valve 608 must be regulated in such a way that pressure $P_K$ in the region 610 and/or 613 can be varied in a planned manner so that, and depending upon the command from the control unit, the clutch is engaged or disengaged or is maintained in a predetermined condition of engagement.

When, in the course of a shifting operation, the clutch reaches a condition of engagement in which it is at least possible to shift out of a gear, the valve 609 is caused to regulate the pressure $P_S$ in the region of the conduits 630, 631. The same as the valve 608, the valve 609 can also constitute a pressure feedback proportional valve, the arrangement of these two valves 608 and 609 corresponding to that of the valves denoted in FIG. 4 by the reference characters 52a and 52b.

The hydraulic circuit which is shown in the section C of FIG. 13 and serves to shift comprises the aforementioned pressure feedback proportional valve 609, a relay valve 632 as well as a conduit 633 and a differential cylinder 635.

The mode of operation of this section or region C will be described in greater detail with reference to FIGS. 14 and 15. There further takes place a monitoring of the distance s and/or of the position of the piston 635 in the differential cylinder, for example, by resorting to a sensor.

The utilization of differential cylinders, such as pressure differential piston systems, exhibits the additional advantage that only one shaft seal is necessary.

The differential cylinders are preferably controlled by means of a proportional pressure regulating valve which serves to modulate the actuating pressure. This can also be replaced with a supply pressure which is regulated by a pressure limiting valve.

Figure 14:
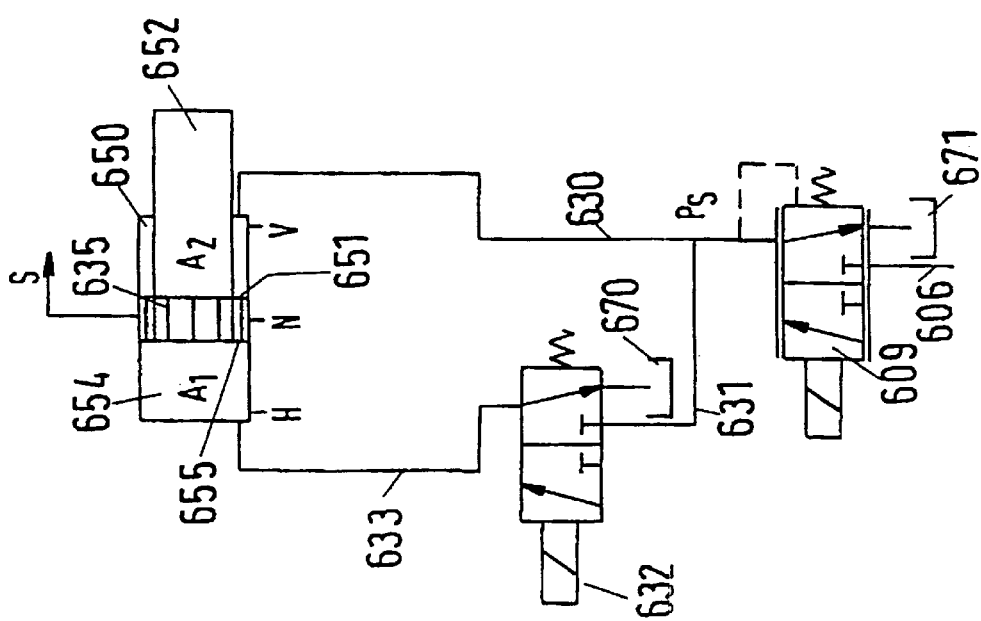

In FIG. 14, the relay valve 632 is set in such a way that the conduit 633 is connected with the oil sump 670, i.e., the pressure in the conduit 633 is practically zero. If the proportional valve 609 in the conduit 630 is set to select a pressure $P_S$ which departs from zero, a substantially identical pressure is set up in the plenum chamber 650 and, due to the action of pressure upon the surface 651, $A_2$, the force acts upon the piston 635 in an axial direction to the left. This causes the piston rod 652 to move in the axial direction which, for example, can result in an axial movement of the gear shifting shaft. The pressure in the chamber 654 is nil and the action of force upon the surface 655, $A_1$ is basically zero. In this manner, one can initiate for example a shifting operation from the neutral position N into the region H, namely into a rear region of the shifting paths or from a region V, namely the front region of the shifting paths, into the neutral region N.

Figure 15:
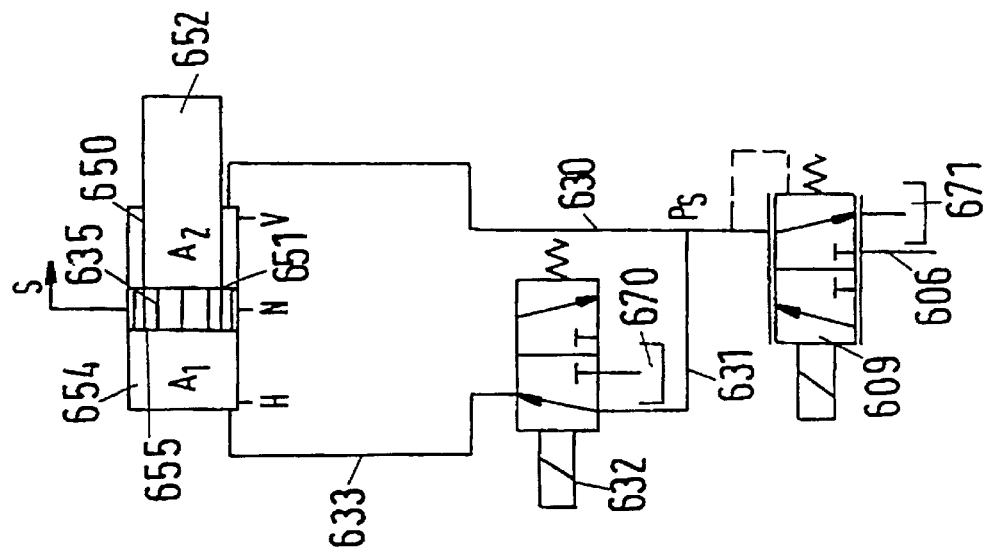

FIG. 15 illustrates an embodiment in which the relay valve 632 is set in such a way that the conduit 631 is communicatively connected with the conduit 633. If the proportional valve 609 is caused to raise the pressure in the conduits 630 and 633, the differential cylinder is actuated in the following way: The pressure in the plenum chamber 650 is the same as in the plenum chamber 654, namely the magnitude of the force F acting upon the surface $A_2$, 651 equals $P_s{}^*A_2$, the force acting upon the surface 655, $A_1$ being equal to $P_s{}^*A_1 = F_1$ and, since $A_1 > A_2$, the piston is being acted upon axially in a direction to the right with a differential force $(F_1 - F_2)$.

If the ratio of the areas of the surfaces $A_1$ and $A_2$, namely 651 and 652, is such that the area of the surface $A_1$ is twice that of the surface $A_2$, the magnitude of the force acting upon the piston of FIG. 14 is the same as that of the force acting upon the piston in FIG. 15, the only difference being the direction of the action of force. In FIG. 14, the piston is being acted upon in a direction toward H whereas, in FIG. 15, the piston is being acted upon in a direction toward V.

By measuring the movement which is indicated by the symbol s at the piston 635, one can regulate or control, such as for example regulate or control as a function of the extent of movement, the movement and/or the position of the piston 635 and hence the extent of movement of internal shifting elements in the transmission 4 in the direction of shifting movement along the shifting paths. In the course of synchronization of the gear which is to be shifted into, it can happen however that the extent of movement is zero and that it becomes necessary to control or regulate the action of pressure or the action of force; under such circumstanes, it is possible to carry out a regulation of pressure during the synchronizing stage by means of the pressure feedback proportional valve 609.

The realization of the pressure- or force regulation or control during shifting and/or during selection of the transmission ratio constitutes a main advantage of the invention over mere movement regulations or movement controls. A movement regulation or control can be superimposed upon a pressure- or force regulation.

An advantage of the pressure- or force regulation or control is that one can select a planned force or pressure which conforms to the operating point. For example, the synchronizing operation can be carried out with a preselectable force in order to protect the synchronizing means of the transmission. It is equally possible to control or regulate the force or the pressure in dependency upon the driver.

A corresponding pressure regulation or pressure control during synchronizing corresponds to a force regulation or force control during gear synchronization, and a comfortable shifting can be carried out or initiated in that the force is small during synchronizing but the force is large during synchronizing in the case of a sporty shifting. Thus, in order to carry out a gear shift, in addition to the differential piston according to FIGS. 13 to 15, it is merely necessary to employ a relay valve which is installed downstream of a proportional valve, and pressure feedback proportional valve, such as for example a pressure reducing valve. For example, the relay valves can constitute 3/2-way spherical seat valves. As disclosed, a pressure regulation can be superimposed upon a movement control or movement regulation in the course of a synchronizing operation.

In this connection, FIG. 13 illustrates a force-time relationship in a coordinate system which is denoted by the character 660. If the actuation of the valves 609 and 632 entails a positioning of the central shifting shaft in the neutral region, as seen in the direction of shifting, the hydraulic unit in the region B of FIG. 3 can carry out a change of paths, namely a gear selecting operation. In order to carry out such a gear selecting operation, a differential cylinder 700 is actuated by means of two valves 701 and 702 in such a way that the axial movement of the component part 703 which is connected with the piston 706 renders it possible to move the selecting shaft. The symbol s denotes, in the same manner as in connection with the coupling cylinder and the shifting cylinder, that one can carry out or that one carries out a measurement of the distance in order to effect a regulation or controlling of the covered distance.

A pressure regulation or control can be superimposed upon the movement regulation or control.

Figure 16:
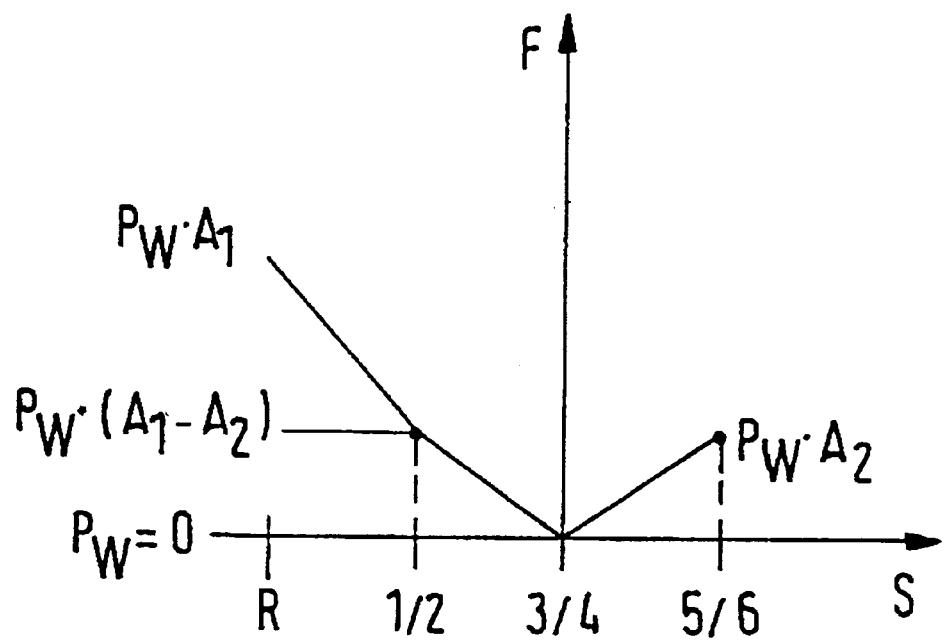
FIG. 16 a diagram.

FIG. 16 shows a force-distance progress or a force-angle relationship in the course of a gear selecting operation within the transmission. In conventional transmissions, the central shifting shaft is acted upon by a force which is supplied, for example, by springs so that, without the need for the application of an external force, the central shaft is urged to path/position 3/4 in the neutral path. This means that, in the path/position 3/4, the central shifting shaft is being acted upon by a smallest force and that an increasing force prevents an automatic change of paths during a change into the path 1/2 or 5/6 or R. An increased force is also required during a transition into the path of the reverse gear R.

If one is to identify the forces which are required to change paths, the maximum force $P_W*A_1$ can be associated with the path change from the path 3/4 into the reverse gear R, and the change from the path 3/4 into the path 5/6 requires a force $P_W*A_2$ in the opposite direction. A change from the path 3/4 into the path 1/2 is selected in such a way that it requires a force $P_W*(A_1-A_2)$.

It is now assumed that the surfaces $A_1$ and $A_2$ are the surfaces of a differential cylinder and that the ratio of their areas is 2:1, i.e., the area of the surface $A_1$ is twice that of the surface $A_2$. It follows that if the pressure in the first plenum chamber 705 with surface $A_1$ is raised and the pressure in the second plenum chamber 704 with surface $A_2$ is relieved, the piston is acted upon with a resultant force which equals $P_W*A_1$. If only the second plenum chamber 704 with the surface $A_2$ is subjected to a pressure $P_W$ and the pressure in the first plenum chamber 705 is relieved, the resultant force $P_W*A_2$ acts upon the piston in the opposite direction. However, if the fluid in the first and second plenum chambers 705, 704 is subjected to the pressure $P_W$, there again results a force acting in the opposite direction and having a magnitude $P_W*(A_1-A_2)$ so that the piston of the differential cylinder can be acted upon in two directions with identical forces and in one direction with doubled force, and all this necessitates the utilization of only two relay valves.

Thus, the magnitude of the selected pressure $P_W$ depends upon which forces prevailing in the interior or externally of the transmission act upon the central shifting shaft during selection of a gear. In accordance with an advantageous design of the differential piston with the surface ratio 2:1, there are established the desirable circumstances that the two forces for the selection from the path 3/4 into the path 5/1 or from the path 3/4 into the 1/2 have identical magnitudes and the transition from the path 3/4 into the path R is twice as large as the forces which must be applied in order to effect a change into the other two paths.

Figure 17:
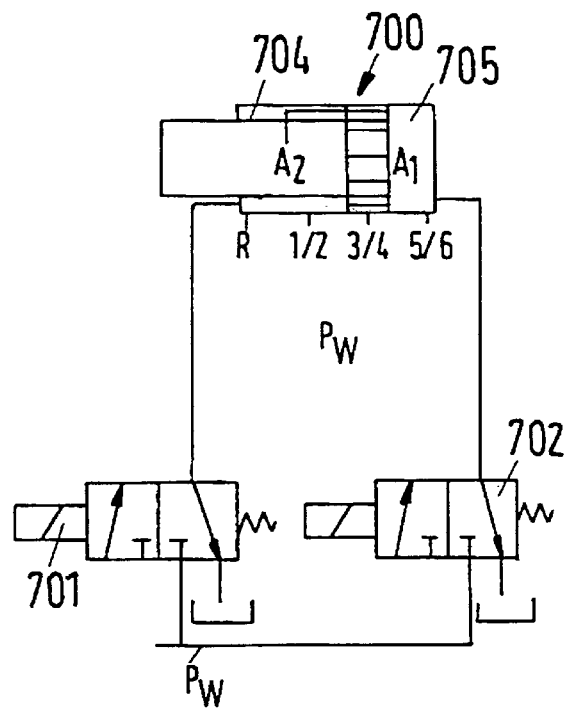
FIG. 17 a hydraulic diagram.

The FIGS. 17 to 20 illustrate these facts on the basis of partial diagrams. In FIG. 17, the valves 701 and 702 are set to relieve the pressure in the plenum chambers 704 and 705. Therefore, the piston remains in the illustrated position, which can be called an idle position because the detent force of the transmission must be exceeded during a change of gear so that the selector shaft remains in the neutral path and assumes the position 3/4.

Figure 18:
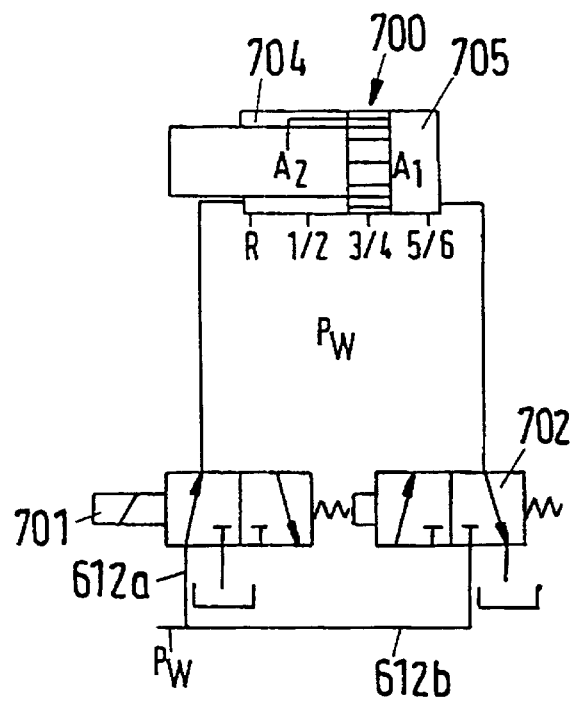
FIG. 18 a hydraulic diagram.

In FIG. 18, a pressure $P_W$ is established in both supply conduits 612a and 612b, and the valve 701 is set to subject the fluid in the plenum chamber 704 to a pressure $P_W$ while the valve 702 relieves the pressure in the plenum chamber 705. Consequently, the surface $A_2$ is being acted upon by an axially oriented force in a direction to the right so that there can take place a change of paths, for example, from the 3/4 path to a 5/6 path.

Figure 19:
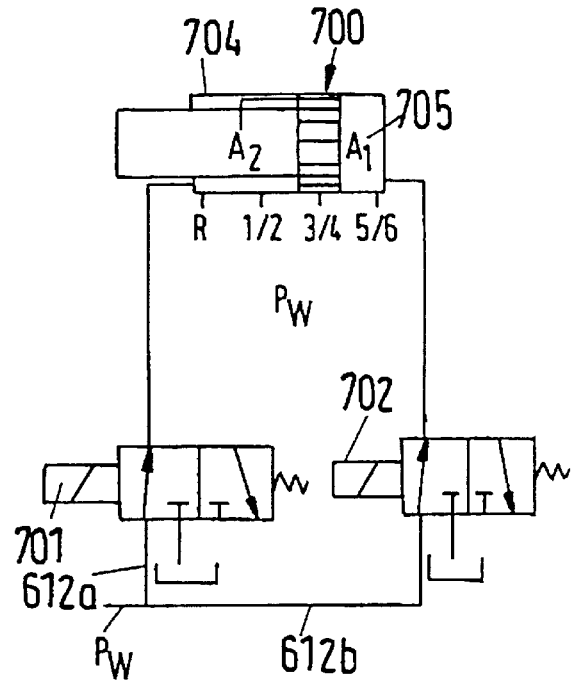
FIG. 19 a hydraulic diagram.

In FIG. 19, a pressure $P_W$ is set up in the hydraulic conduits 612a and 612b, the valve 701 and the valve 702 being adjusted for throughflow so that the pressure $P_W$ is the same in the plenum chambers 705 and 704. Due to the surface area diference $(A_1-A_2)=A_2$, a force $A_2$ can act, for example, in the axial direction toward the left, upon the piston and hence upon the the cylinder. Strictly speaking, the effective force $P_W*(A_1-A_2)$, and the selection of $A_1$ and $A_2$ is preferably caused to conform to the design of the transmission.

Figure 20:
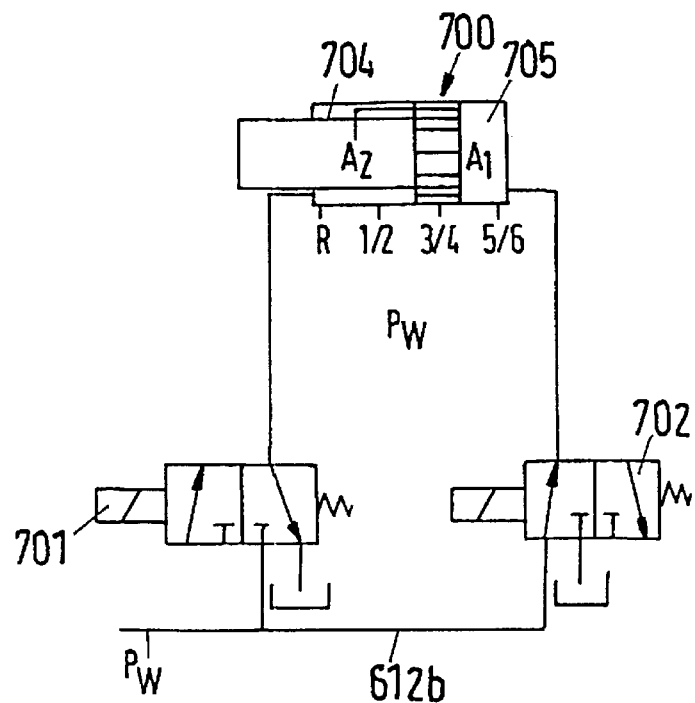
FIG. 20 a hydraulic diagram.

Next, FIG. 20 shows the application of pressure $P_W$ in the chamber 705 because the valve 701 is set to relieve or reduce the pressure in the chamber 704 and the valve 702 is set to raise the pressure in the chamber 705. Consequently, the piston is acted upon in the axial direction to the left by a maximum force $P_W* A_1$. This is the force which is necessary to shift into the path R as shown in FIG. 16. The relationships of the forces can change if the conditions in the transmission are different so that, for example, the path 1/2 is designed as the path with the application of minimal force and a much greater or somewhat greater force is required for a gear change from the path 1/2 into another path.

In accordance with the method which was explained with reference to FIGS. 17 to 20 and which is resorted to in order to actuate the selecting cylinder 700, completed selection of the path is followed by completion of the shifting operation in such a way that, once in the shifted in or selected path, the central shifting shaft is caused to move in the forward or rearward direction V, H so that the transmission is shifted into gear. In the next step, the clutch can be actuated again in a direction toward closing, i.e., the clutch is reengaged.

The pressure modulation for the purpose of initiating the gear selecting operation is carried out with the pressure feedback proportional valve 608 and, during each stage of the gear selecting operation, the pressure $P_K$ must be so high that the clutch, to which the pressure $P_K$ is being simultaneusly applied in a direction toward opening, remains disengaged.

In accordance with the invention, the two pressure feedback proportional valves 608 and 609 of FIG. 13 are designed in such a manner that the clutching and gear selecting operations are initiated by the valve 608 but the operation of shifting into gear is initiated by the other valve 609 because the clutching and selection necessarily follow each other, i.e., must or should be carried out serially but the shifting operation can be initiated even though the clutch is not as yet completely disengaged, i.e., a second valve 609 is needed for the carrying out of the shifting operation.

In accordance with a further advantageous possibility, provision can be made that the initiation of the gear shifting operation also begin subsequent to completion of the clutching operation so that the initiation of the gear shifting operation can also be controlled by the proportional valve 608. In this manner, one can ensure that only a single proportional valve is needed to initiate sequentially the clutching operation, the shifting operation and the selecting operation and, furthermore, that additional regulation merely involves that of relay valves. A sequence could be selected as follows: disengaging the clutch, shifting from a gear position into neutral, selection (optional) and again shifting into a gear prior to subsequent engagement of the clutch. This cycle can be stored sequentially in the control apparatus so that there can take place an automated carrying out of operating the shift transmission and the actuation of the differential piston system does not necessitate a serial selection of gear stages. For example, by skilled selection of the paths, one can shift from the first gear into any desired gear.

The relay valves 701, 702, 632 are so-called black-white-shifting valves, and the proportional valves can be set to assume any desired condition. As a rule, the volumetric flow to actuate the clutch disengaging member, such as a central disengaging member, is in the range of 1 to 10 liters per minute and the initiation of actuation of the gear selecting operation necessitates values in the range of 0.1 to 5 liters per minute, preferably between 0.3 and 1 liter. Corresponding applies for the initiation of the gear shifting operation. The pump 602 which is shown in FIG. 13 can constitute, for example, a radial piston pump.

Figure 21A:
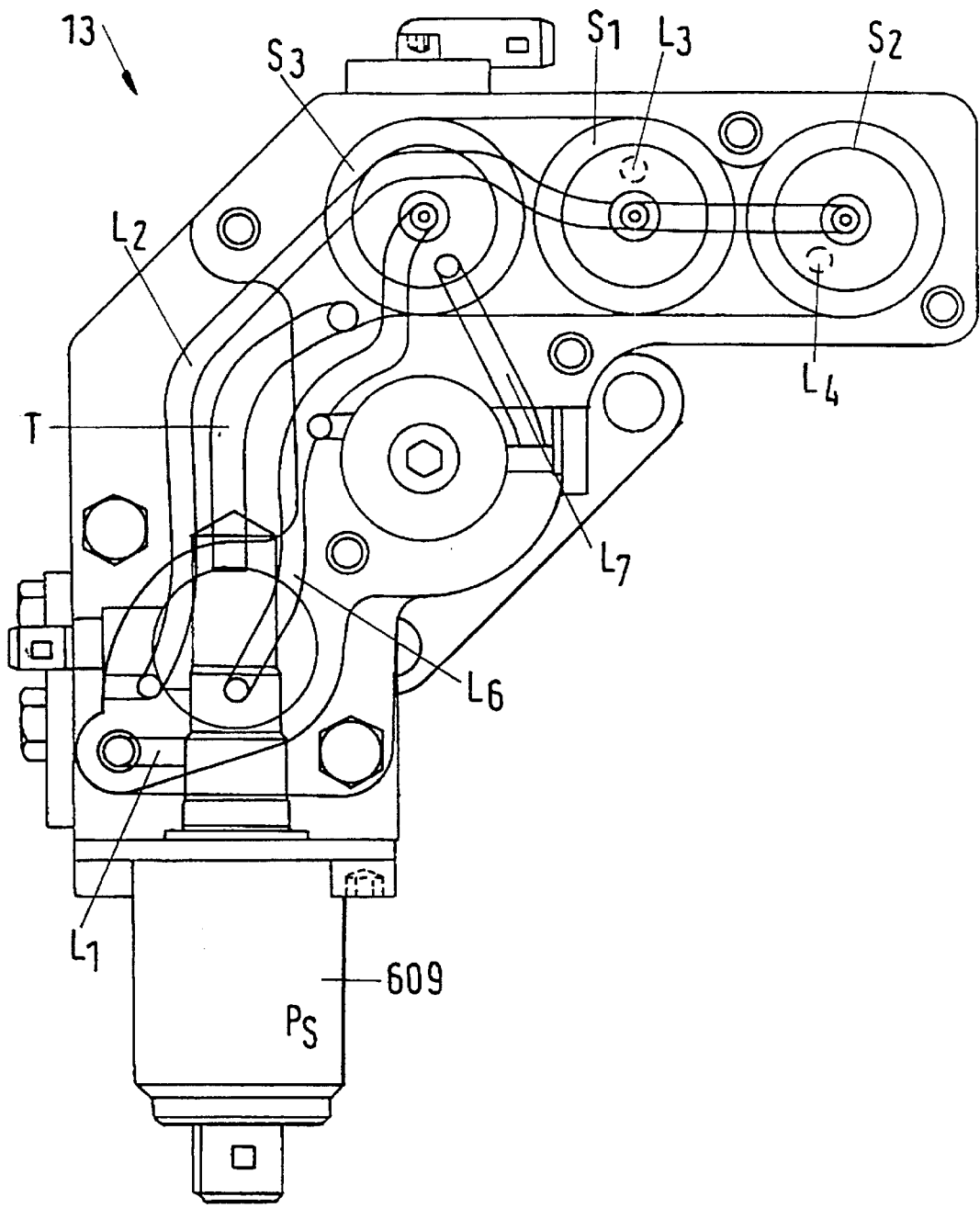
FIG. 21a a view of an actuator.

FIG. 21a illustrates an actuator 13, such as the actuating unit of FIG. 3, in an elevational view, there being shown the hydraulic conduits and the valves which are installed in the actor. The relay valves S1, S2 and S3 correspond, in the hydraulic scheme, to the valves 701, 702 and 632, i.e., the valves S1 and S2 control the differential cylinder 700 for the control of the selecting operation, and the relay valve S3 controls the shifting operation.

There is further shown a proportional valve 609. In this Figure, the proportional valve 608 for the control of clutch actuation and of the gear selecting operation is located behind the valve 609 so that it is concealed by the latter.

The hydraulic conduit L1, 605 establishes a connection from the accumulator 604, i.e., from the pump 600, and this conduit L1 establishes a connection between the two proportional valves 608 and 609 on the one hand, and the hydraulic supply system on the other hand. The hydraulic conduit L2, 612 connects the proportional valve 608 with the relay valves 701, S1 and 702, S2. The hydraulic conduit L3 connects the relay valve S1, 701 with the differential cylinder 700, and the hydraulic conduit L4 connects the relay valve F2, 702 with the differential cylinder 700. The hydraulic conduit L7 connects the relay valve S3, 632 with the differential cylinder 635 for switching, and the hydraulic conduit L6, 630 connects the proportional valve 609 with the differential cylinder 650 for switching.

Figure 21B:
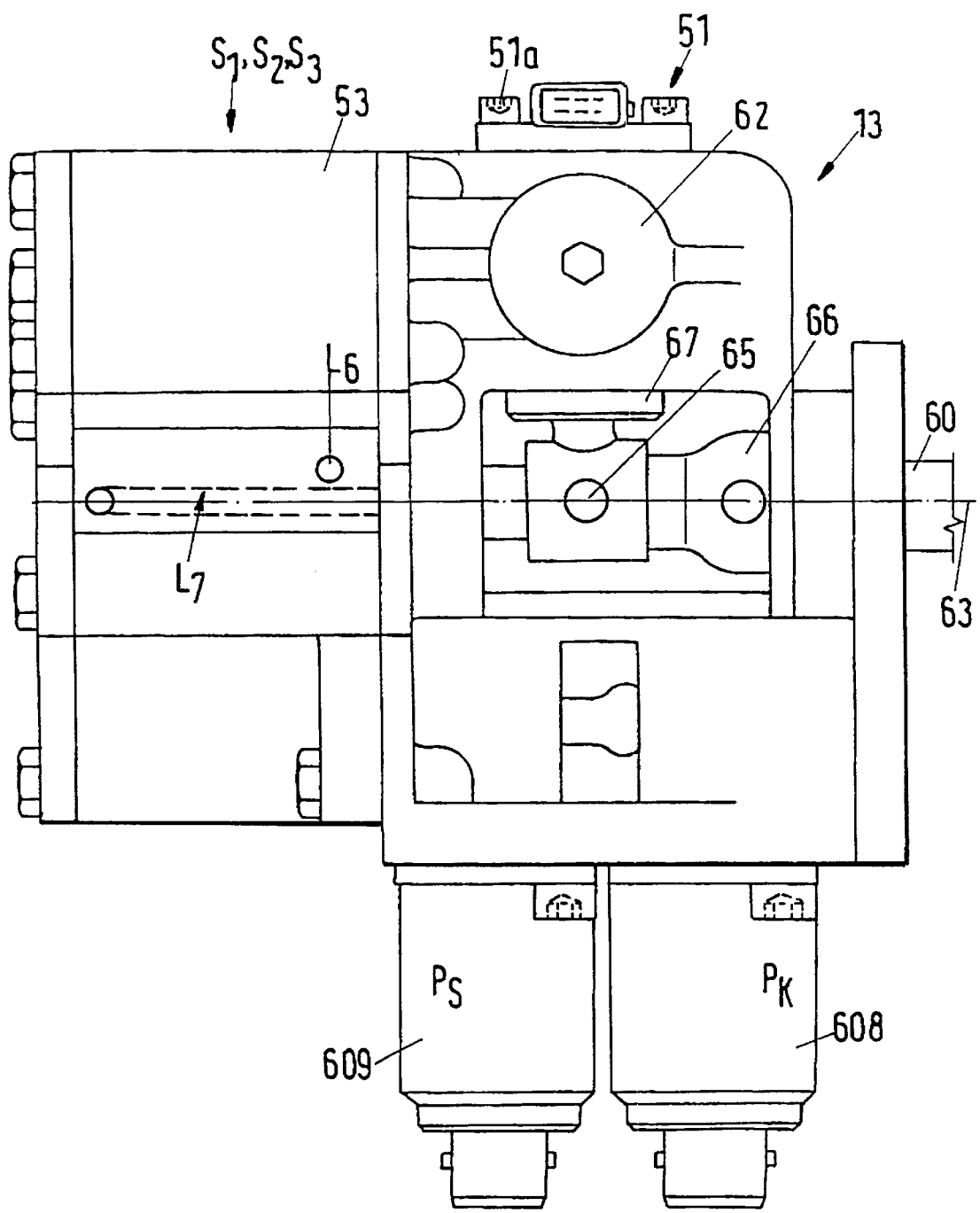
FIG. 21b a view of an actuator.

FIG. 21b again shows the actuator but in a different view, there being shown the hydraulic conduits L6 and L7 for actuation of the differential cylinder 635 for switching by way of the relay valve S3, 632 and proportional valve 609.

Figure 21C:
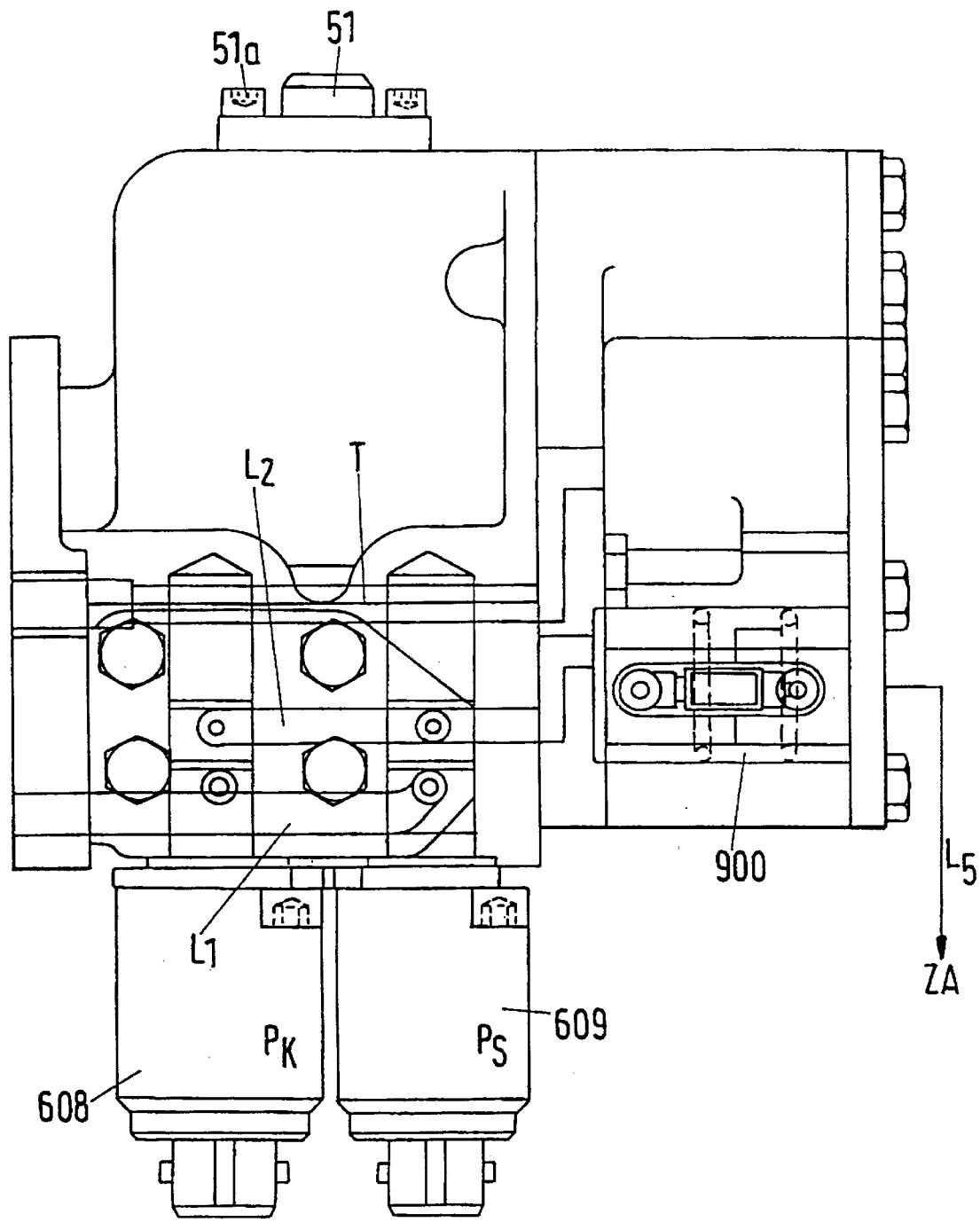
FIG. 21c a view of an actuator.

FIG. 21c illustrates the actuator in a further view, there being shown the conduit L2 and the conduit L1. There are further shown the proportional valve 609 and the proportional valve 608.

Figure 23:
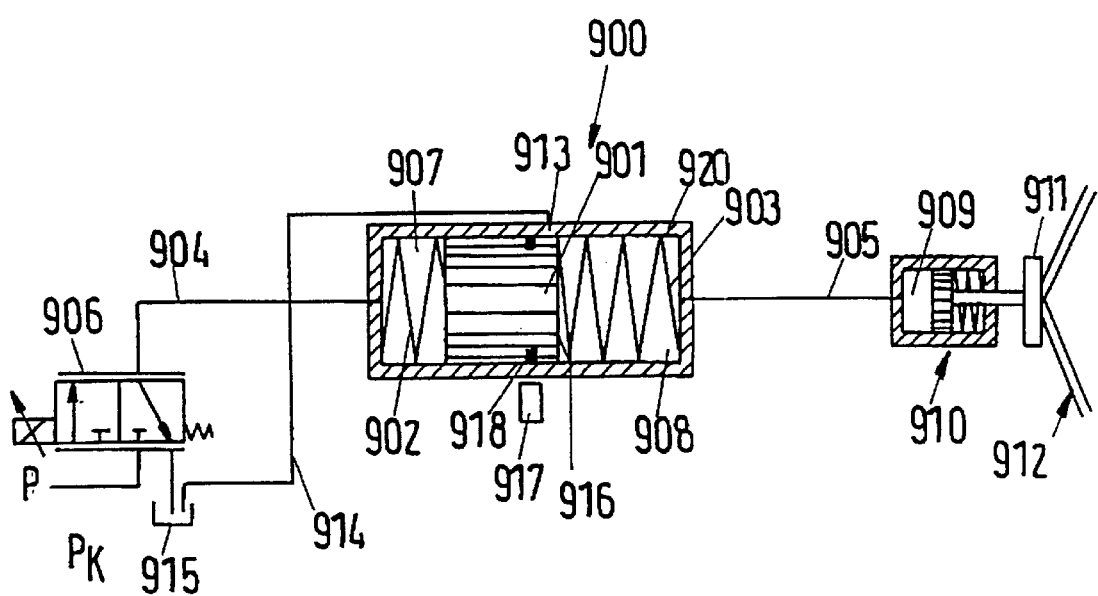
FIG. 23 a detail of a hydraulic diagram with a sensor piston.

Furthermore, it can be seen that the sensor piston 900, which is shown schematically in FIG. 23, is built into the actuator. Thus, the sensor piston is integrated into the conduit 610 in the hydraulic plan on page 13. The outlet of the sensor piston 900 is a connection for the conduit $L_5$ to the central disengaging member ZA for the clutch.

Figure 22:
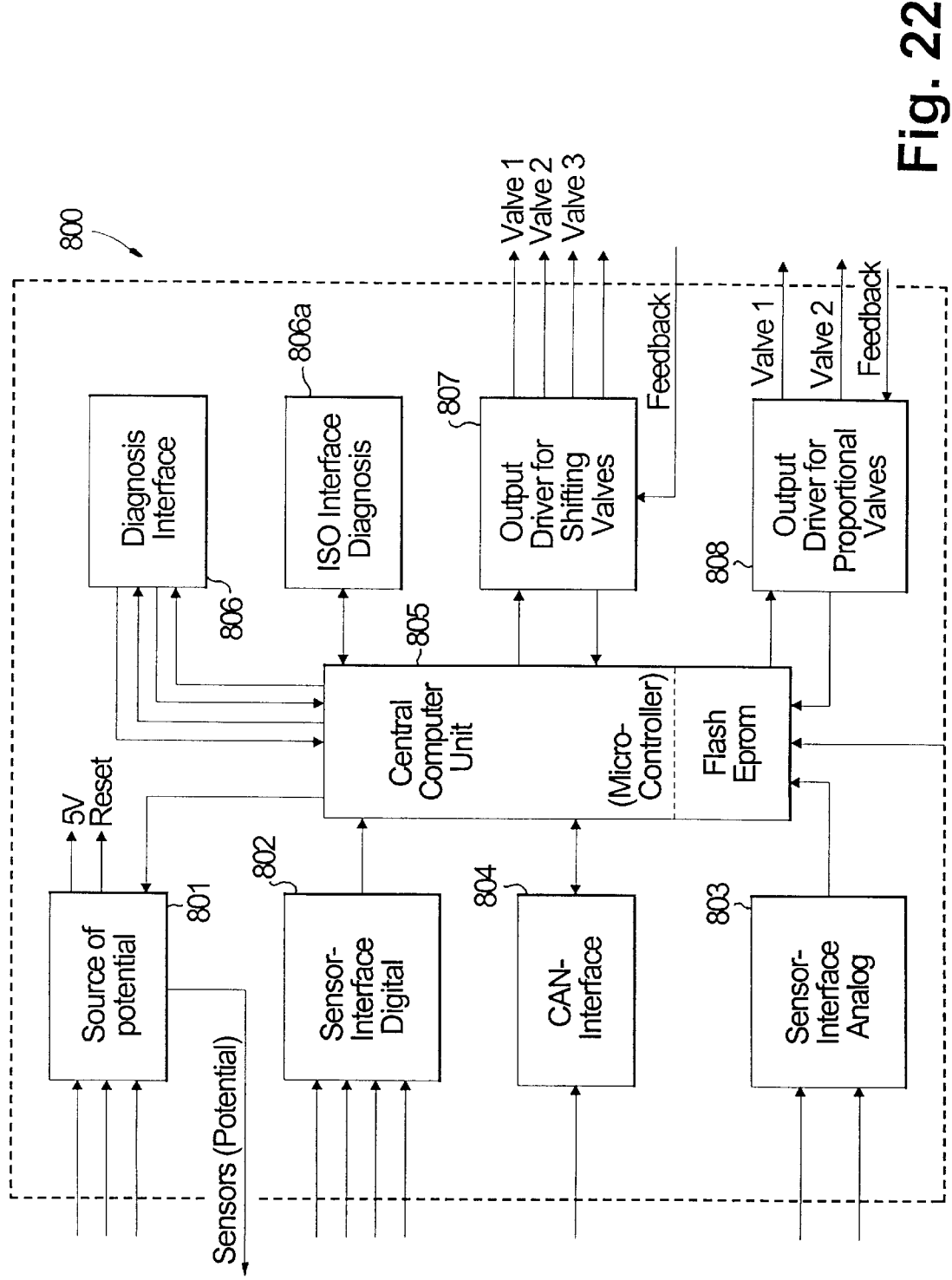
FIG. 22 a block diagram.

The control apparatus is shown in greater detail in FIG. 22, the control apparatus 800 being illustrated as being framed by a broken line. The control unit 800 comprises a source 801 of potential which supplies the sensors and the units of the control unit. It is also possible to provide a sensor interface 802 which processes the digital signals. There is further provided a sensor interface 803 for analog signals, as well as a CAN-bus interface 804. For example, the inputs of the sensor interfaces (digital) 802 are the selection- and shifting inputs as well as the pressure switch of the accumulator. For example, the inputs of the sensor interfaces (analog) 803 are the path recognition or the shifting movement monitoring as well as the monitoring of the clutch movement.

The arrows which are shown in FIG. 22 denote the signal transmitting and supply connections.

For example, the CAN-bus interface 804 receives input signals from the gas pedal or gas pedal sensor as well as signals denoting the rotational speed of the engine, the RPM of the wheels, the engine torque, the angle of the throttle valve, the brakes such as operational and parking brakes as well as for example the idling switch and optionally whether or not antislip regulator is active, as well as other possible signals. The CAN-bus can receive signals by way of the outputs of the interface components, such as for example an indication of the gear ratio, an indication of the condition of the clutch, an engine input, a starter relay or a tempomat. Still further, the unit 800 encompasses a central computer unit 805, such as a microcontroller, which carries out the computing operations for the control or regulation, it being possible to provide a flash EPROM.

There are further available diagnosis-interface modules 806, for example, to furnish during the prototype stage signals denoting the operating conditions. Furthermore, it is possible to provide an iso-interface 806a for the purposes of diagnosis. It is also possible to address the diagnosis-interfaces 806, 806a during the service intervals. Still further, there is provided an output driver 807 for the relay valves and an output driver 808 for the proportional valves; these drivers control the valves and, at the same time, can receive signals from the valves, such as position indicating signals.

Further control units, such as controls for the engine, the hydraulic pump, are not illustrated. The same holds true for the sensors, such as Hall generators, for the detection of the selection- and shifting inputs or the recognition of the gear ratio or the recognition of the shifting path. Such signals are transmitted to the control unit as indicated by the arrows (denoting signal transmitting conductors).

FIG. 23 illustrates a sensor piston- or floating piston arangement 900 with a floating piston 901 which is being acted upon by springs 902 and 903 within a chamber. The two springs fix the piston in the position "clutch engaged". The springs are preferably designed in such a way that they can barely overcome the frictional forces acting upon the piston, i.e., that they can move the piston in the cylinder when the movement is not prevented by hydraulic means. There are further provided hydraulic conduits 904 and 905 one of which connects the proportional valve 906 with the chamber 907 and the other of which connects the chamber 908 with the plenum chamber 909 of the central disengaging member 910 which latter actuates the clutch by way of a disengaging bearing 911 as well as by means of the diaphragm spring 912 only certain portions of which are actually shown. Furthermore, the arrangement 900 is provided with a snifting opening, such as a snifting bore 913, which is connected with the sump 915 by way of a hydraulic conduit 914. When a control edge 916 advances beyond the snifting bore, this ensures the establishment of a pressure equilibrium between the bodies of fluid in the cylinder chambers 907 and 908. This takes place only when the clutch is fully engaged, namely the snifting bore can be exposed only in such condition of the clutch.

In order to monitor the axial position of the piston 901, there is provided a position sensor 917 which monitors the position of the piston in a contactless fashion by means of at least one transmitter, such as a magnet 918. In the embodiment of FIG. 23, the position monitoring sensor is a Hall effect generator which cooperates with a, for example, ring-shaped magnet 918. The ring magnet 918 can be disposed at a desired portion of the piston, for example, as shown in FIG. 23; however, the ring magnet can also be installed at an end region of the piston.

When the clutch is engaged, the diaphragm spring 912 of the clutch acts upon the hydraulic system in such a way that the piston is fixed basically in the position "clutch engaged". During disengagement of the clutch, the piston is displaced through a certain distance depending upon the volume of oil and the diameter. Together with the hydraulic transmission, this distance is proportional to the clutch movement. Thus, the position of the piston 901 is characteristic of the extent of engagement of the clutch so that one can ascertain the torque which can be transmitted by the clutch on the basis of the position of the piston.

In addition to the aforementioned Hall generators, the sensors can preferably constitute also other types of sensors with local resolution character, such as for example, an inductive sensor wherein an induction coil is employed to monitor the extent of penetration into the winding of a ferromagnetic material which is connected with or is provided on the piston.

If the piston exhibits a leak, namely if its function is improper, for example because the hydraulic medium flows from the chamber 907 into the chamber 908, the piston 901 moves relative to the housing 920 while the condition of engagement of the clutch remains unchanged. When the clutch is disengaged, the movement of the piston is such that it gradually moves toward the "engaged position". This is attributable to the action of the springs 903 and 902. If the clutch is thereupon engaged, the piston migrates beyond the position which appeared to be the "engaged position" since it has assumed such position already at a time when the clutch was still disengaged. However, the piston migrates only to an extent such that the snifling bore establishes an equalization of volumes. The positional equalization, namely the shifting of the piston back to the position which is considered to be the "engaged position", is assisted by the springs. In this manner, one can ensure a possibly limited determination of clutch movement even in the event of improper operation such as a leakage at the sensor piston. The provision of a snifling bore 913 is intended to compensate for faulty operation, such as for example thermal effects. This snifling bore is provided in the region of an end position of the piston and is exposed at certain time intervals. The control unit selects the intervals for the exposure of the snifling bore at such operating points at which this exposure presents no problems as concerns the operational reliability of the clutch. An exposure of the snifling bore takes place as a result of complete engagement of the clutch. This initiates an operation similar to a "hydraulic reset", the quantities of oil in the chambers 907, 908 are equalized and the system is back in the original state, namely a state which is assumed in the absence of a leakage or other faulty operation.

A system employing the sensor piston or floating piston of FIG. 23 can be put to use not only to separate the media at the transmitter and receiver sides but also exclusively as a measuring system without a media separating effect. In the event of a media separation, the pressure medium, such as a fluid, which is utilized at one side of the piston can be different from that at the other side of the piston. For example, one can employ a braking fluid and a hydraulic fluid ATF.

Figure 24:
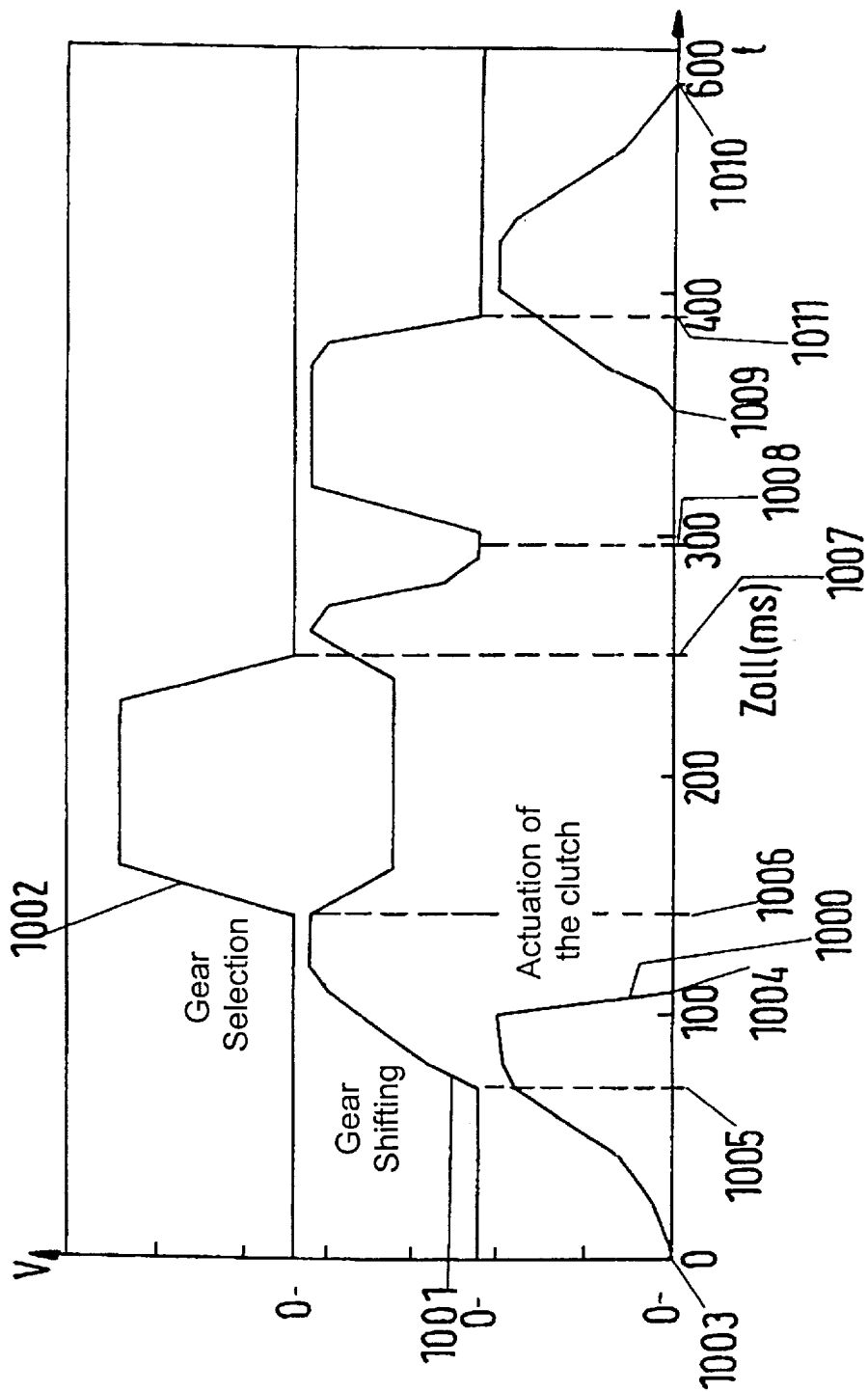
FIG. 24 a diagram.

FIG. 24 illustrates diagrammatically the progress of an automated clutching, shifting and selecting operation as a function of time, i.e., the velocities of the pistons of the adjusting members or of the shafts of the adjusting means are measured along the ordinate. The curve 1000 denotes the velocity of the master cylinder piston during clutching, the curve 1001 denotes the velocity of the adjusting member for shifting, and the curve 1002 denotes the velocity of the adjusting member for gear selection, all as a function of time.

The clutch is disengaged at the instant t=0.1003, i.e., the velocity of the clutch actorics increases. Prior to complete disengagement of the clutch at the instant 1004, the gear shifting operation is already initiated, as at 1005. The gear selecting operation is initiated at the instant 1006 and is completed at the instant 1007. In the course of the gear selecting operation, the velocity of the monitored element of the shifting actorics did not decrease to zero, i.e., during this stage of gear shifting one takes advantage of the so-called tiltable shiftability of the transmission. This means that it is possible to carry out a change of paths at a position within a shifting path before the shifting actorics reach the neutral position, such as the neutral path.

The reaching of the shifting velocity 1001 at the instant 1008 is the result of synchronization in the newly selected gear, and the shifting operation is completed at the instant 1011. The clutch is reengaged between the instants 1009 and 1010. A reduction of the velocity of the shifting actor at the instant 1008 entails that, during this stage of movement control or movement regulation, one can or one must carry out a slave pressure regulation of pressure control because, if the velocity is zero, the control- or regulating value disappears if only a movement regulation or movement control is being carried out.

Figure 25:
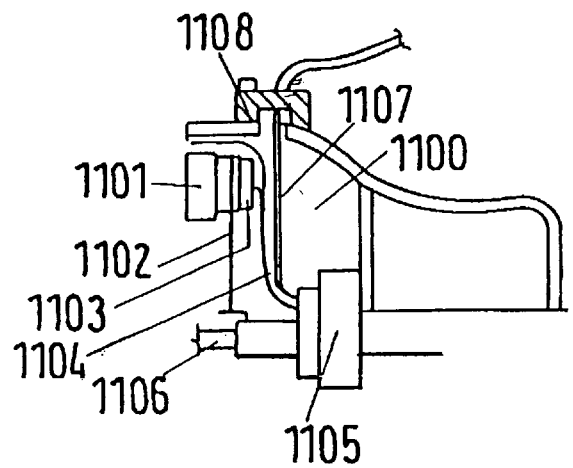
FIG. 25 a sectional view of a transmission bell.

FIG. 25 is a schematic partial sectional view of a transmission bell with a flywheel 1101, a clutch disc 1102, a pressure plate 1103 as well as a diaphragm spring 1104 and a disengaging bearing 1105. Such component parts of the clutch are coaxial with the transmission input shaft 1106, and this clutch determines the magnitude of transmissible torque. The disengaging position of the disengaging bearing 1105 is monitored by a sensor 1107 which extends into the interior of the transmission bell through an opening in the transmission bell. The holding means 1108 for the sensor 1107 is screwed onto or plugged into the transmission bell from the outside.

Figure 26:
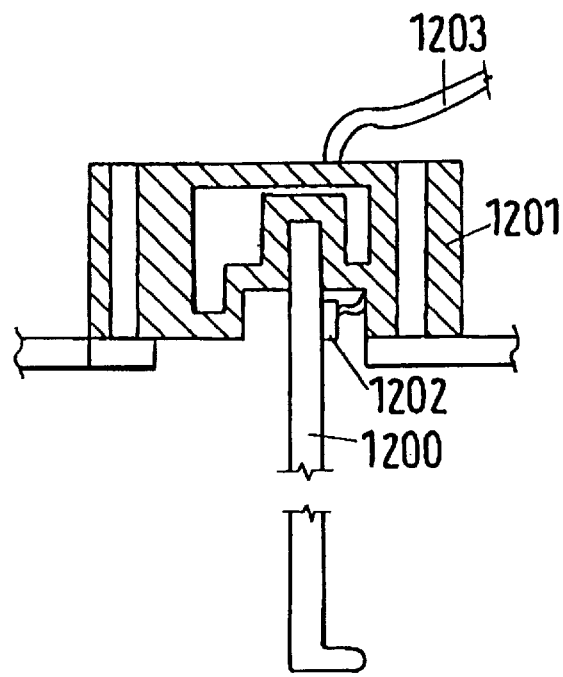
FIG. 26 a sensor.

FIG. 26 is an enlarged view of a sensor. A flexible stress bar 1200 is secured to the transmission bell by way of a sensor plate 1201 and, due to axial movability of the disengaging bearing 1105, there takes place a bending of the stress bar 1200, and such bending is monitored by a sensor 1202. For example, this sensor can constitute a strain gauge or a piezoelectric crystal. Thus, the sensor consists essentially of a bendable rod which is fixedly anchored at one end and the other end of which is deflectable at right angles to the longitudinal direction of the bar. Due to such bending, the marginal fibers or marginal zones undergo stretching and compression which is detected by resorting to a suitable monitoring principle (strain gauge, piezo, etc.). The processed output signals, which are transmitted to the central control unit by way of a connecting cable 1203, are a direct indication of the extent of bending or actuating movement if the resolution and the accuracy of reproduction are acceptable. It is advisable to locate the sensor elements close to the locus of anchoring of the stress bar. This ensures that the critical parts are not located in the region of elevated temperatures. Another advantage is that the sensor can be integrated into the threadedly connectable plate 1201 and the maximum stretching of the stress bar is in this region.

The clutch movement sensor which is illustrated in FIGS. 25 and 26 monitors the axial displacement of the disengaging bearing without the need for the provision of additional moving parts. Moreover, the temperature-sensitive component parts are disposed outside of the clutch space or in the marginal region of the clutch space. The sensor is well suited for mounting on existing systems, i.e., for the utilization as an add-on sensor because, save for the small and often existing opening in the wall of the transmission and the available fastening means, it is not necessary to carry out any further modifications.

In an automated shift transmission, the shifting rod is to carry out two movements.
1. a rotary movement for the selection of paths, and
2. a translatory movement during shifting (withdrawing from and shifting into a gear)

All presently preferred prerequisites which are required to carry out the "shifting" operation are described in the following list.
1. Utilization of a differential piston which entails that only one shaft seal is necessary
2. hydraulic circuitry according to the plan, see for example FIG. 13.
   the pressure modulating valve preferably constitutes a proportional pressure regulating valve for the modulation of shifting pressure. The shifting pressure determines the synchronizing torque and hence the synchronizing speed to thus exert a pronounced influence upon the convenience of shifting. In this plan, there is employed a proportional pressure reducing valve. However, this could be replaced with a supply pressure regulatable by a relief valve.
   The relay valve is utilized for the selection of the direction of movement.
   The force $P_S*(A_1-A_2)$ acts in a movement direction to the right, and the force $P_S*A_2$ acts in a direction to the left. If, and as is preferred, the areas of $A_1$ and $A_2$ are the same, there follows an identical controlled amplification.
   If the valves are set to connect with the tank, no forces are acting upon the shifting rod. This is preferably realized in the position "electrical actuator currentless".
   The pressure source is a conventional accumulator-charging unit. It supplies the system pressure.
   The clutching pressure and the shifting pressure are branched off the system pressure, and this necessitates large dynamic volumetric flows. This ensures that the mutual influencing, if any, of the valves is minimal because the accumulator furnishes a pronounced damping action.
   The supply pressure for selection is branched off the clutching pressure. Clutching and selection as well as selection and shifting can be initiated entirely independently of each other.
   The clutching pressure, which is also the supply pressure for gear selection, should be substantially constant if, for the purposes of dynamics, the clutch remains slightly engaged.
   If this is not necessary, it is possible to slightly modulate the clutching pressure which serves as supply pressure for gear selection in order to optimize the selecting operation. However, a prerequisite for this is that such pressure be higher than the pressure which is required for the disengagement of the clutch. It is of advantage if the clutch is disengaged by resorting to hydraulic pressure.

In the absence of current (e.g., failure of the electronics), the momentary condition of shifting remains unchanged, i.e., the clutch remains engaged in a particular gear of in neutral.

As far as the clutch is concerned, there exist two possibilities:
1. The clutch is engaged when the pressure reducing valve connects to the tank in the absence of current flow. This is better, as far as the consumption of energy is concerned, because no current consumption takes place when the clutch is engaged.
2. The clutch becomes disengaged when the clutch pressure reducing valve is currentless and shifts the clutch for the application of system pressure.

Such pressure might drop gradually in view of potential leakage to thus effect a gradual engagement of the clutch. This procedure might be preferable as far as safety is concerned even though it is less satisfactory insofar as the consumption of energy is concerned. However, this enables the clutch to act as a parking brake.

Figure 27:
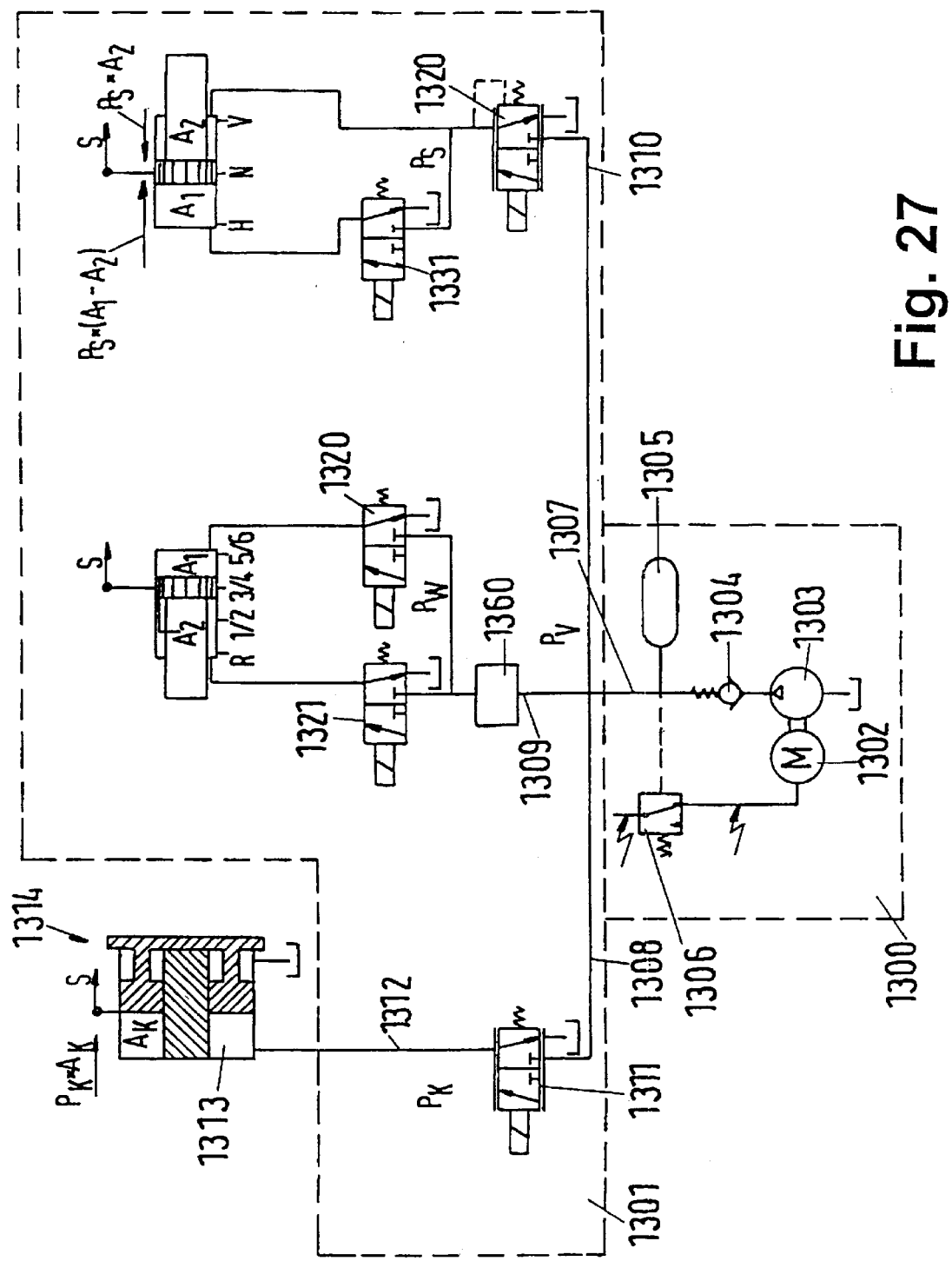
FIG. 27 a hydraulic diagram.

FIG. 27 illustrates a hydraulic plan for initiating the operation of a transmission, such as for example, a transmission which shifts with an interruption of pulling force, and the operation of a torque transmitting system, such as a clutch.

Basically, the hydraulic diagram of FIG. 27 is divided into two sections. One of the sections is denoted by the character 1300 and constitutes a hydraulic supplying unit, and the other section 1301 constitutes an actuating unit, such as an actuating unit. The supplying unit 1300 comprises an electromotor 1302 serving to drive a hydraulic pump 1303. There is further provided a check valve 1304 as well as an accumulator 1305 for storage of a pressurized pressure medium within such unit. There is also provided a sensor 1306 which ascertains whether the hydraulic pressure prevailing in the accumulator is above or below a preselectable threshold value. If the pressure in the accumulator 1305 is beneath a first preselectable value, the motor for the pump is started until the pump ensures that the pressure in the accumulator has risen above a second preselectable value.

Starting from the hydraulic conduit 1307, the adjusting members for the actuation of the torque transmitting system, such as a clutch, or of actuating units for shifting into and/or for the selection of gears in a transmission are controlled by valves. In the embodiment of FIG. 27, each adjusting member is provided with its own independent supply path, such as a hydraulic path. Proceeding from the conduit 1307, the hydraulic conduit 1308 supplies fluid for actuation of the clutch, the hydraulic conduit 1309 supplies fluid for the gear selecting operation, and the hydraulic conduit 1310 supplies fluid for the gear shifting operation.

The proportional valve 1311 can constitute a proportional directional control valve in order to control or regulate the pressure $P_K$ in the hydraulic conduit 1312, namely the pressure which prevails in the plenum chamber 1313 of the hydraulic clutch disengaging member 1314 for actuation of the clutch.

The valve 1311 can constitute a proportional directional control valve or a proportional pressure reducing valve. Analogously, the proportional valve 1311 can be provided with an internal pressure regulating circuit (pressure reducing valve). Such proportional valves are proportional valves of special design, particularly with an additional internal control loop. In such a pressure feedback pressure regulating valve, the regulated pressure can be the load pressure prevailing in the pressure zone 312. An advantage of this is that the actuating variable can be constituted by the pressure which is to be controlled or regulated.

The pilot pressure $P_V$ in the conduit 1309 is utilized to select, in a planned manner, the pressure $P_W$ for the initiation of the gear selecting operation. The connection 1309 directly from the accumulator 1305 or from the pump to the relay valves 1320 and 1321 constitutes an advantageous modification of the hydraulic circuit which is shown in FIG. 13 because this renders it possible to initiate an independent gear selecting operation and an independent clutching operation without it being necessary to influence one of these procedures in dependency upon the other procedure. The shifting operation as well as the actuation of the valves 1320 and 1321 are based on the situations described with reference to FIGS. 17 to 20 so that the description need not be repeated here. However, reference should be had to the description of such Figures.

The pilot pressure $P_V$ in the region 1310 is converted by the valve 1330 into control pressure $P_S$ for initiation of the gear shifting operation, the selection of the pressure PS taking place by way of the relay valve 1331 and the proportional valve 1330, such as a proportional directional control valve or a pressure feedback proportional pressure reducing valve. Reference should be had again to the descriptions of the preceding Figures.

Figure 28:
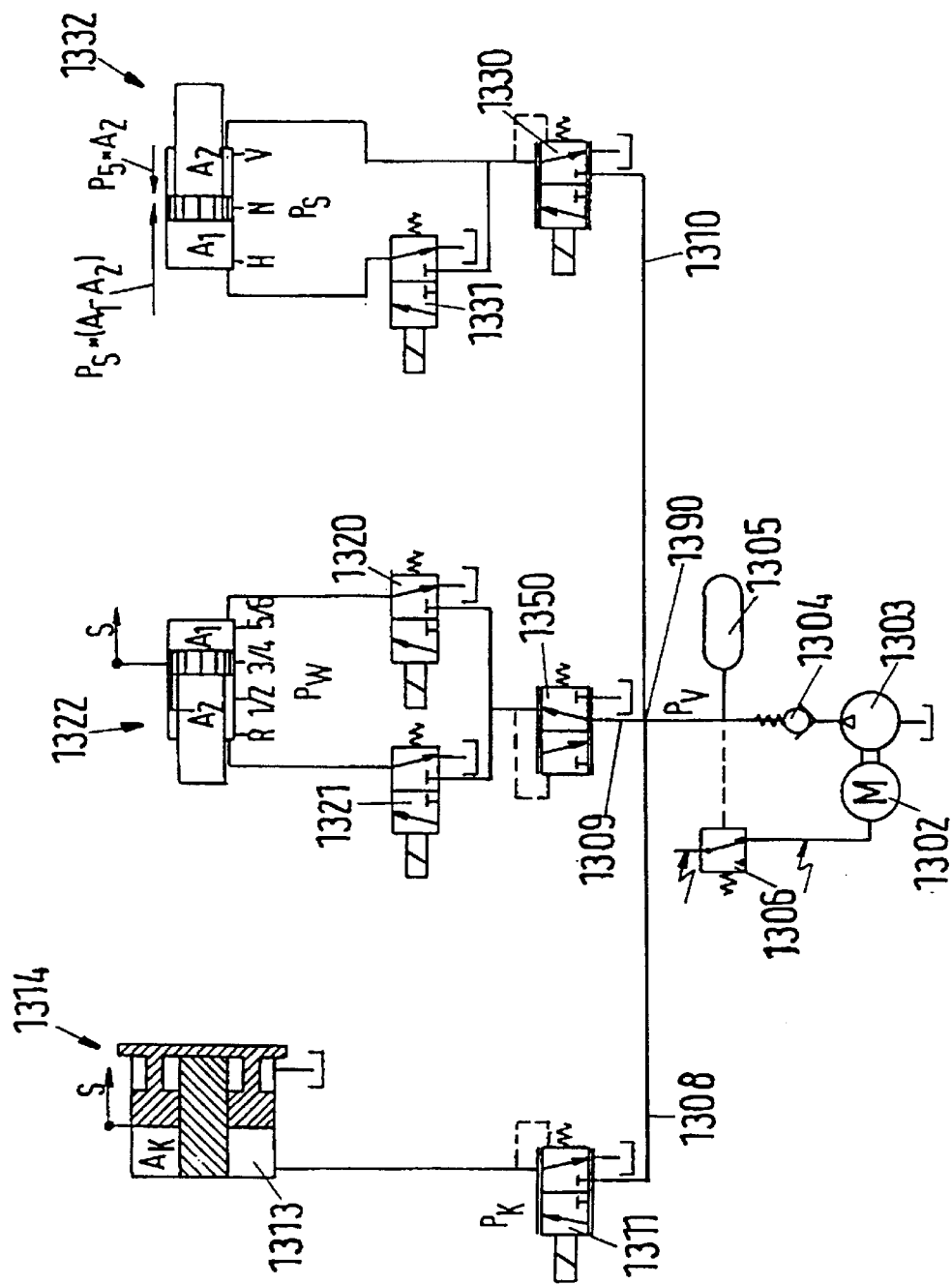
FIG. 28 a hydraulic diagram.

FIG. 28 illustrates a further advantageous embodiment of a hydraulic circuit having a hydraulic unit with an electric motor 1302 serving to drive a pump 1303, with a check valve 1304, an accumulator 1305 as well as with a sensor 1306 which monitors the pressure of hydraulic fluid in the accumulator. Starting at the junction 1390, one employs hydraulic conduits 1308, 1309 and 1310 in order to initiate the control of pressurized fluid for the clutching operation by way of adjusting member 1314, the gear selecting operation by way of adjusting member 1322, as well as the gear shifting program by way of the control member 1332. The fluid pressure in the plenum chamber 1313 of the adjusting cylinder is selected by a proportional valve, such as a pressure feedback pressure reducing valve 1311. The fluid pressure in the plenum chambers of the adjusting member 1332 is selected by the proportional valve 1330 and relay valve 1331.

In order to provide the pressure $P_W$ for gear selection, a pressure feedback proportional valve 1350 furnishes a control pressure which is controlled by the valves 1320 and 1321 for the purpose of being applied in the plenum chambers of the adjusting member 1322.

In the fluid path 1309, the accumulator 1305 can be followed by a throttle valve 1360 or a primary flow restrictor, this throttle valve 1360 being installed upstream of the relay valves 1320 and 1321 which initiate the gear selecting operation. The throttle valve 1360 effects a reduction of the pressure which is being applied to the relay valves 1320,1321 as compared with the pressure in the accumulator 1305. If the pilot pressure $P_V$ in the accumulator 1305 is sufficiently low, the throttle valve can be dispensed with. If necessary, a throttle valve corresponding to the valve 1360 can also be provided in the flow path 1308 and/or 1310.

FIG. 29 illustrates an actuating unit 1400, such as an actuating unit, with a first adjusting member 1401 for the carrying out of the shifting operation as well as with a second adjusting member 1402 for initiation of the gear selecting operation. The shifting movement as well as the selecting movement, and also the actual condition of the transmission are monitored by a sensor 1403 which can be secured to the actuating unit 1400. It is also possible to interchange the functions of the adjusting members 1401 and 1402 in dependency upon the nature of the transmission which is being utilized or controlled.

The adjusting member 1402 comprises a piston 1410 which is installed in a receptacle and separates two plenum chambers 1412 and 1413 from each other. Those surfaces of the piston which are being acted upon by pressurized fluid and entail an axial displacement of the piston constitute differential surfaces, i.e., the piston is a differential piston so that, when the pressures are the same, this results in the development of different axially oriented forces.

The adjusting member 1402 is constructed in such a way that a first plenum chamber 1420 confines a piston surface 1421 and that a second piston is provided in a second chamber region 1430 within the housing and has a second piston surface. The two pistons are connected to each other by a piston rod 1422. When the fluid in the plenum chambers 1420 is pressurized, there takes place a shifting of the piston rod 1422 and hence a pivoting of the fork 1440 so that the central shifting shaft 1441 is rotated. This entails a displacement of the transmitter 1450 for the sensor 1403 so that the sensor detects a different position.

The actuating unit 1400 is connected with the hydraulic unit by means of hydraulic supply conduits in such a way that, for example, a second block contains the valves which initiate the operation of the actuating unit, such as an actor unit. Furthermore, a hydraulic pump, too, can be integrated into such block; however, the pump can also be mounted separately.

Furthermore, the initiation of operation of the clutch is effected by an adjusting member which preferably acts directly upon the clutch. Due to this, such adjusting member is not integrated into the actuating unit 1400.

The patent claims which are filed with the application are formulation proposals without prejudicing the acquisition of broader patent protection. The applicants reserve the right to claim additional features which, up to this time, are disclosed solely in the specification and/or in the drawings.

The references made in the dependent claims point toward further development of the matter of the main claim with features of the respective dependent claims; they are not to be understood as a waiver of the attempt to obtain independent substantive protection for the features of the referenced dependent claims.

The features recited in such dependent claims constitute independent inventions for constructions not dependent upon those of the matters of the preceding dependent claims.

Still further, the invention is not limited to the embodiments which are disclosed in the specification. On the contrary, it is within the purview of the invention to carry out numerous changes and modifications, especially such variations, elements and combinations and/or materials which, for example, might be of an inventive nature as a result of combination or modification of features and/or elements or methods outlined in the general description and in the description of embodiments and in the claims and which, as a result of a combination of features, can lead to a new product or to novel method steps and/or process steps, also insofar as they pertain to methods of producing, testing and operating.

What is claimed is:

1. A motor vehicle comprising a prime mover; an automated transmission shiftable into a selected one of a plurality of gears; a system for transmitting torque between said prime mover and said transmission, said system being operable to assume engaged and disengaged conditions; a hydraulic unit comprising a source of pressurized fluid including an accumulator, means for connecting said source with said transmission, and regulating means associated with said connecting means and operable to effect a planned selection of and shifting into one of said gears; and means for operating said system and for operating said regulating means, wherein said operating means comprises at least one proportional valve and a conduit connecting said proportional valve with said system and said regulating means comprises at least one selector valve provided in said connecting means downstream of said proportional valve as considered in the direction of fluid flow from said source to said transmission, said at least one proportional valve being arranged to control the pressure of fluid in said connecting means in a disengaged condition of said system and said at least one selector valve being arranged to determine the selection of a gear by said regulating means in said disengaged condition of said system.

2. The motor vehicle of claim 1, wherein said system includes an automated friction clutch.

3. The motor vehicle of claim 1, wherein said regulating means includes at least one valve.

4. The motor vehicle of claim 1, wherein said operating means and said unit together constitute a unitary module.

5. The motor vehicle of claim 1, wherein said operating means and said unit respectively constitute separate first and second modules and said connecting means includes at least one conduit arranged to establish a path for the flow of fluid between said modules.

6. The motor vehicle of claim 1, wherein said system comprises at least one cylinder and said operating means comprises at least one adjustable valve and a conduit connecting said valve with said at least one cylinder.

7. The motor vehicle of claim 1, wherein said system includes a mobile engaging/disengaging element and said regulating means includes at least one gear selecting/shifting element, one of said unit and said operating means comprising at least one device for monitoring the extent of movement of at least one of said elements.

8. The motor vehicle of claim 1, wherein said regulating means includes at least one mobile gear selecting/shifting element and said regulating means comprises at least one device for monitoring the extent of movement of said at least one element.

9. The motor vehicle of claim 1, wherein said regulating and operating means ana said unit respectively constitute separate first and second modules and said connecting means comprises at least one conduit connecting said modules, said system including a mobile engaging/disengaging element and said regulating means including a mobile gear selecting/shifting element, said operating means comprising a first device for monitoring the extent of movement of said engaging/disengaging element and said regulating means comprising a second device for monitoring the extent of movement of said gear selecting/shifting element.

10. The motor vehicle of claim 1, wherein said system includes a mobile engaging/disengaging element and said transmission comprises at least one mobile gear selecting/shifting element, and further comprising a conduit connecting said operating means with said mobile engaging/disengaging element, said operating means including at least one first proportional valve and said regulating means including at least one second proportional valve in said connecting means.

11. The motor vehicle of claim 10, further comprising at least one selector valve provided downstream of the respective proportional valve as seen in the direction of fluid flow from said source.

12. The motor vehicle of claim 1, wherein said system includes a mobile engaging/disengaging element and said transmission includes a mobile gear selecting element and a mobile gear shifting element, at least one of said operating means and said regulating means comprising at least one proportional valve.

13. The motor vehicle of claim 12, wherein said at least one proportional valve is disposed in a conduit connecting said source with said engaging/disengaging element.

14. The motor vehicle of claim 12, wherein said proportional valve is installed in said connecting means between said source and said gear selecting element.

15. The motor vehicle of claim 12, wherein said proportional valve is installed in said connecting means between said source and said gear shifting element.

16. The motor vehicle of claim 1, wherein at least one of said operating means and said regulating means comprises at least one adjustable selector valve.

17. The motor vehicle of claim 1, wherein said system includes a mobile engaging/disengaging element and said transmission includes at least one mobile gear selecting/shifting element, and further comprising at least one conduit connecting said operating means with said system, at least one of said regulating and said operating means comprising at least one proportional valve installed in one of said at least one conduit and said connecting means.

18. The motor vehicle of claim 17, wherein said at least one of said regulating and said operating means further comprises an adjustable selector valve disposed downstream of said at least one proportional valve as considered in the direction of fluid flow from said source.

19. The motor vehicle of claim 17, further comprising an adjustable selector valve in the other of said at least one conduit and said connecting means.

20. The motor vehicle of claim 1, wherein said system comprises a mobile engaging/disengaging element and said transmission comprises a mobile gear selecting element and a mobile gear shifting element, said operating means comprising at least one first proportional valve in a conduit connecting said source with said engaging/disengaging element and said regulating means comprising at least one second proportional valve provided in said connecting means for said gear shifting element.

21. The motor vehicle of claim 20, further comprising at least one selector valve for at least one of said proportional valves, said at least one selector valve being disposed downstream of the respective proportional valve as considered in the direction of fluid flow from said source.

22. The motor vehicle of claim 1, wherein said regulating means comprises a differential cylinder provided in said connecting means and having first and second cylinder chambers, at least one proportional valve provided in said connecting means upstream of said cylinder as considered in the direction of fluid flow from said source, and first and second selector valves provided in said connecting means downstream of said at least one proportional valve to respectively determine the flow of fluid to and from and the pressure of fluid in said first and second cylinder chambers, said cylinder including a mobile piston disposed between said chambers to determine the shifting into a selected gear in dependency upon the differential of fluid pressures in said chambers.

23. The motor vehicle of claim 22, wherein said regulating means includes means for adjusting said selector valves so that (a) the pressure of fluid in one of said chambers at least approximates the pressure of fluid in the other of said chambers, (b) the pressure of fluid in at least one of said chambers is at least close to zero, and (c) the pressure of fluid in one of said chambers is higher than the pressure of fluid in the other of said chambers.

24. The motor vehicle of claim 23, wherein said regulating means includes means for establishing a plurality of differences between the pressures of fluid in said chambers, at least for each of said plurality of gears.

25. The motor vehicle of claim 1, wherein said regulating means comprises a differential cylinder provided in said connecting means and having first and second cylinder chambers, at least one proportional valve provided in said connecting means upstream of said cylinder as considered in the direction of fluid flow from said source, and first and second adjustable selector valves provided in said connecting means downstream of said at least one proportional valve to respectively determine the flow of fluid to and from and the pressure of fluid in said first and second cylinder chambers, said cylinder including a mobile piston disposed between said chambers to determine the selection of gears in dependency upon the differential of fluid pressures in said chambers.

26. The motor vehicle of claim 25, wherein said at least one proportional valve is adjustable to control the pressure of fluid in said connecting means between said at least one proportional valve and said selector valves.

27. The motor vehicle of claim 26, wherein said at least one proportional valve is a slide spool valve.

28. The motor vehicle of claim 26, wherein said at least one valve is a directional control valve.

29. The motor vehicle of claim 26, wherein said at least one proportional valve is a pressure reducing valve.

30. The motor vehicle of claim 29, wherein said pressure reducing valve is a feedback-operated valve.

31. The motor vehicle of claim 1, wherein at least one of said operating means and said regulating means comprises at least one differential cylinder having first and second cylinder chambers and being disposed in said connecting means to shift said transmission into a selected gear in dependency upon the relationship of fluid pressures in said chambers and the position of at least one mobile piston provided in said at least one cylinder between said chambers.

32. The motor vehicle of claim 31, wherein said regulating means further comprises at least one selector valve for the determination of forces acting upon said at least one piston in dependency upon the pressures of fluid in said chambers.

33. A motor vehicle comprising an engine; a transmission shiftable into selected ones of a plurality of gears; an engageable and disengageable torque transmitting system in a path for the flow of torque between said engine and said transmission; and an operating unit for initiating changes in the extent of engagement of said system and a shifting of said transmission into selected gears to thus effect an automated gear change, said operating unit being arranged to receive a pressurized flowable medium by a hydraulic unit having a pump and an accumulator, said operating unit comprising at least one operating member and said hydraulic unit further comprising valves and hydraulic connections arranged to carry out controlled gear selecting and shifting operations, said operating and hydraulic units comprising a first section in which a proportional valve controls a fluid pressure for shifting said transmission by way of a second operating member and a second valve downstream of said proportional valve is arranged to select the shifting direction, said operating and hydraulic units further comprising a second section wherein a proportional valve controls a fluid pressure for the actuation of said system by means of said at least one operating member and for the selection of a gear by a third operating member, at least one additional valve downstream of said proportional valve in said second section being arranged to initiate the selection of a gear.

34. A motor vehicle comprising an engine; a transmission shiftable into a plurality of gears; an engageable and disengageable torque transmitting system in a torque transmitting path between said engine and said transmission; and a hydraulic unit including a pump and at least one valve for operation of a hydraulic cylinder arranged to control the torque adapted to be transmitted by said torque transmitting system along an engaging/disengaging path, the disengagement of said torque transmitting system being monitored by a sensor which is disposed in a fluid conveying connection to an operating member for said torque transmitting system and comprises a piston which, by its position relative to a sensor, denotes the extent of disengagement of said torque transmitting system.

35. The motor vehicle of claim 34, wherein said piston is axially movably mounted in a housing, at least one side of said piston being acted upon by at least one spring disposed in said housing, discrete plenum chambers being disposed in front of and behind said piston, as seen in an axial direction of said piston, said plenum chambers being provided with hydraulic connections and said sensor being arranged to monitor the axial position of said piston, a controlled actuation of said torque transmitting system bringing about an axial displacement of said piston.

36. A motor vehicle comprising an engine; a transmission shiftable into selected ones of a plurality of gears; an engageable and disengageable torque transmitting system in a path for the flow of torque between said engine and said transmission; and an operating unit for initiating changes in the extent of engagement of said system and a shifting of said transmission into selected gears to thus effect an automated gear change, said operating unit being arranged to receive a pressurized flowable medium by a hydraulic unit having a pump and an accumulator, said operating unit comprising at least one operating member and said hydraulic unit further comprising valves and hydraulic connections arranged to carry out controlled gear selecting and shifting operations, said operating and hydraulic units comprising a first section in which a proportional valve controls a fluid pressure for the torque transmitting system, said operating and hydraulic units further comprising a second section wherein a proportional valve controls a fluid pressure for the actuation of said system by means of one operating member, said operating and hydraulic units further comprising a third section for the selection of a gear by a third operating member, at least one additional valve downstream of one of a hydraulic resistance and a pressure reducing valve in said third section being arranged to initiate the selection of a gear.

\* \* \* \* \*

UNITED STATES PATENT AND TRADEMARK OFFICE
CERTIFICATE OF CORRECTION

PATENT NO. : 6,116,391
DATED : September 12, 2000
INVENTOR(S) : Burkhard KREMMLING et al.

It is certified that error appears in the above-indentified patent and that said Letters Patent is hereby corrected as shown below:

On the Title Page

The spelling of the name of the eighth inventor from "Gerhard HETTLICH" to read:

-- Gerhard HETTICH --

Signed and Sealed this

Twenty-fourth Day of April, 2001

Attest:

NICHOLAS P. GODICI

*Attesting Officer*     *Acting Director of the United States Patent and Trademark Office*